(12) United States Patent
Kreit et al.

(10) Patent No.: US 8,020,453 B2
(45) Date of Patent: Sep. 20, 2011

(54) INDUCTIVE POSITION SENSOR

(76) Inventors: Darran Kreit, Foxton (GB); Mark Anthony Howard, Worlington (GB)

( * ) Notice: Subject to any disclaimer, the term of this patent is extended or adjusted under 35 U.S.C. 154(b) by 165 days.

(21) Appl. No.: 11/721,769

(22) PCT Filed: Dec. 14, 2005

(86) PCT No.: PCT/GB2005/004835
§ 371 (c)(1),
(2), (4) Date: Jun. 14, 2007

(87) PCT Pub. No.: WO2006/064236
PCT Pub. Date: Jun. 22, 2006

(65) Prior Publication Data
US 2009/0039874 A1    Feb. 12, 2009

(30) Foreign Application Priority Data

Dec. 14, 2004  (GB) .................... 0427410.6

(51) Int. Cl.
*G01L 3/00*  (2006.01)
(52) U.S. Cl. ................................... 73/862.331
(58) Field of Classification Search ......... 73/862.331–862.338
See application file for complete search history.

(56) References Cited

U.S. PATENT DOCUMENTS

| | | | |
|---|---|---|---|
| 5,003,260 A * | 3/1991 | Auchterlonie | 324/207.16 |
| 5,815,091 A | 9/1998 | Dames et al. | |
| 6,011,389 A * | 1/2000 | Masreliez et al. | 324/207.17 |
| 6,265,867 B1 * | 7/2001 | Fowler | 324/207.25 |
| 6,489,899 B1 * | 12/2002 | Ely et al. | 341/20 |
| 6,522,128 B1 * | 2/2003 | Ely et al. | 324/207.17 |
| 6,999,007 B2 * | 2/2006 | Lin et al. | 341/20 |
| 7,298,137 B2 * | 11/2007 | Howard et al. | 324/207.24 |
| 7,451,658 B2 * | 11/2008 | Sills et al. | 73/779 |

FOREIGN PATENT DOCUMENTS

| | | |
|---|---|---|
| DE | 3910597 | 10/1990 |
| WO | 2004/036147 | 4/2004 |
| WO | 2004/098943 | 11/2004 |

* cited by examiner

*Primary Examiner* — Lisa M Caputo
*Assistant Examiner* — Octavia Davis
(74) *Attorney, Agent, or Firm* — Renner, Otto, Boisselle & Sklar, LLP

(57) ABSTRACT

A system to measure the displacement of relatively moveable bodies along an axis comprising: a resonant electrical intermediate device further comprising an inductor, whose width varies along the displacement axis, and a capacitor in electrical series which co-operates with an antenna comprising transmit and receive windings whose mutual inductance varies according to the position of the electrical intermediate device relative to the antenna.

24 Claims, 16 Drawing Sheets

1,14    12    13    15

INDUCTIVE POSITION SENSOR

This application is a national phase of International Application No. PCT/GB2005/004835 filed Dec. 14, 2005 and published in the English language.

FIELD OF THE INVENTION

This invention relates to an inductive displacement detector, operable to measure the displacement of relatively moveable bodies.

REVIEW OF THE ART KNOWN TO THE APPLICANT

Various forms of detector have been used to measure the position of relatively moveable bodies. They are variously referred to as detectors, sensors, transducers, encoders, measurement devices or systems.

A common form of detector is the linearly variable differential transformer (LVDT). Typically, in such devices, a magnetically permeable core moves relative to a primary and secondary winding. Linear forms are typically referred to as LVDTs and rotary forms are variously referred to as rotary variable differential transformers (RVDTs), synchros and resolvers. The degree of electrical coupling between the windings varies in proportion to the position of the core. Such transformers have been used for many years and have a well-deserved reputation for accuracy and reliability. They are widely used in industrial and metrology applications. The transformer construction typically requires precision winding of large numbers of fine conductors. Consequently, they are expensive to produce, delicate and heavy. Such attributes prevent their widespread use.

In order to make such transformer constructions less expensive, more robust and lighter, Inductosyn Ltd. of Stockport, United Kingdom produced various products, dating from the 1960's, using planar forms of linear and rotary transformers. In these, a first, planar, serpentine winding is energised with an AC signal and moves relative to a second, planar, serpentine winding. The degree of electrical coupling is indicative of the relative position of the two windings. Both sets of windings require an electrical connection. This greatly limits the scope for Inductosyns to those applications where electrical connections could be maintained, for example, in low speed linear displacements, rotary encoders with low rotations between 0 and 360 degrees or where slip rings are permissible.

U.S. Pat. No. 4,737,698 discloses an inductive sensor in which a conductive target or electrical intermediate device such as a copper disk moves relative to a planar arrangement of transmit and receive windings. Application of a high frequency input to the transmit winding results in a modulated output from the receive windings which may be demodulated to provide a signal indicative of the electrical intermediate device's position relative to the receive windings. In order to produce sufficiently high signal to noise ratios, a relatively high input voltage signal is required and the target's stand off distance must be kept to a minimum. High input energy produces high electromagnetic emissions and the minimal stand-off distance limits the scope of application. Further, the position of only one target may be detected per set of transmit and receive windings.

U.S. Pat. No. 5,796,250 discloses a rotary displacement encoder in which various rotors each contain an electrically resonant, passive circuit. The rotors are housed in a 3-dimensional arrangement of transmit and receive windings. The invention solves some of the problems normally associated with simple conductive electrical intermediate devices but the winding arrangement is only practical for rotary or odometer types of construction.

The authors have previously disclosed a number of inventions relating to the measurement of electrical intermediate devices which move relative to planar arrangements of transmit and receive windings. For example, GB02/01204 discloses a method in which high frequency carrier signals are modulated with lower frequency signals in order to provide a digital signal generation and processing technique suitable for position measurement. The necessary electronics circuit is expensive; the software is complex; the measurement frequency is limited by the lower modulation frequency and the range of geometries is limited.

The present invention encompasses the concept of a low cost, high speed, accurate and robust device to detect the relative positions of two or more bodies which is applicable to a variety of topologies.

In a preferred embodiment, the device comprises an arrangement of transmit and receive windings attached to a first body and at least one electrical intermediate device attached to a second body operable to move in an axis relative to the first body and wherein the electrical intermediate device comprises a capacitor and inductor in electrical series and wherein the dimension of the inductor measured transversely to the displacement axis varies such that the level of mutual inductance between the transmit and receive windings varies according to the position of the two bodies.

SUMMARY OF THE INVENTION

In its broadest aspect, the invention provides a device for measuring the position of a first body relative to a second body comprising: a first body which further comprises an arrangement of transmit and receive windings and a second body which comprises an electrically resonant intermediate device whose inductor width, measured at right angles to the measurement axis, varies such that the level of mutual inductance between the transmit and receive windings varies according to the position of the two bodies.

Viewed from a further aspect, the invention provides an inductive displacement detector according to claim 1.

Preferably the electrically intermediate device comprises a capacitor and inductor in electrical series so as to form a resonant or tank circuit.

Preferably the electrical intermediate device's inductor is formed by conductive tracks on a printed circuit board.

Preferably the detector is controlled by an electronics circuit which is constructed so that it may control several sets of detectors each of which has its own distinct resonant frequency.

Preferably the detector is controlled by an electronics circuit which is constructed so that it may control several sets of detectors each of which has its own period of time in which to transmit and receive signals.

Preferably the electronics circuit comprises a device with electronic memory which may store data such as measurement parameters, configuration data or calibration values.

Preferably the detector is calibrated prior to use with a measuring instrument of higher measurement accuracy and the resulting calibration values stored in the detector's electronic memory.

Preferably the electrical intermediate device comprises windings arranged as a sinusoid over the displacement range.

Preferably the electrical intermediate device comprises windings in a constant coupling loop.

Preferably the electrical intermediate device comprises windings arranged as a repetitive pattern over the displacement range.

Preferably the electrical intermediate device comprises windings arranged as a single coarse and a repetitive fine pattern.

Preferably the electrical intermediate device comprises windings arranged as a multiplicity of repeating patterns of differing pitch so as to form a Vernier style of pattern.

Preferably the electrical intermediate device comprises windings arranged as a multiplicity of repeating patterns, at least two of differing pitch so as to form a Vernier style of pattern and at least one further winding of a smaller repeating pitch so as to form a fine pitch.

Preferably the antenna comprises electrically balanced transmit and receive windings Preferably the electrical connections to the antennae or electronics are transmitted via a set of transformer windings.

Preferably the electrical intermediate device's electrical circuit contains a switch in series with the capacitor and inductor so as to provide contactless transmission of switch status.

Preferably the electrical intermediate device contains a multiplicity of resonant circuits whose frequency or position or both may be detected so as to provide a method of identification.

Preferably an electrical intermediate device whose position is fixed or known is used together with at least one electrical intermediate device whose position is to be measured so that the reliable operation of the detector may be checked.

Preferably one portion of the electrical intermediate device's inductor has a magnetically permeable core which is operable to displace relative to the inductor's windings so that the change in the core's position may be contactlessly detected as a change in the electrical intermediate device's resonant frequency.

Preferably electrical intermediate devices of various frequencies may be energised by a single antenna so that the position of multiple electrical intermediate devices may be measured by a single antenna.

Preferably the detector is used to measure the relative twist of two parts of a stationary or rotating shaft as a means of measuring the torque applied to the shaft.

Preferably the detector compensates for temperature by using a system to measure temperature and alter the measured position accordingly.

Preferably the detector measures temperature by measuring the resistance of at least one of the antenna's windings.

BRIEF DESCRIPTION OF THE DRAWINGS

In the accompanying drawings.

DESCRIPTION OF THE PREFERRED EMBODIMENT

Figure 1:
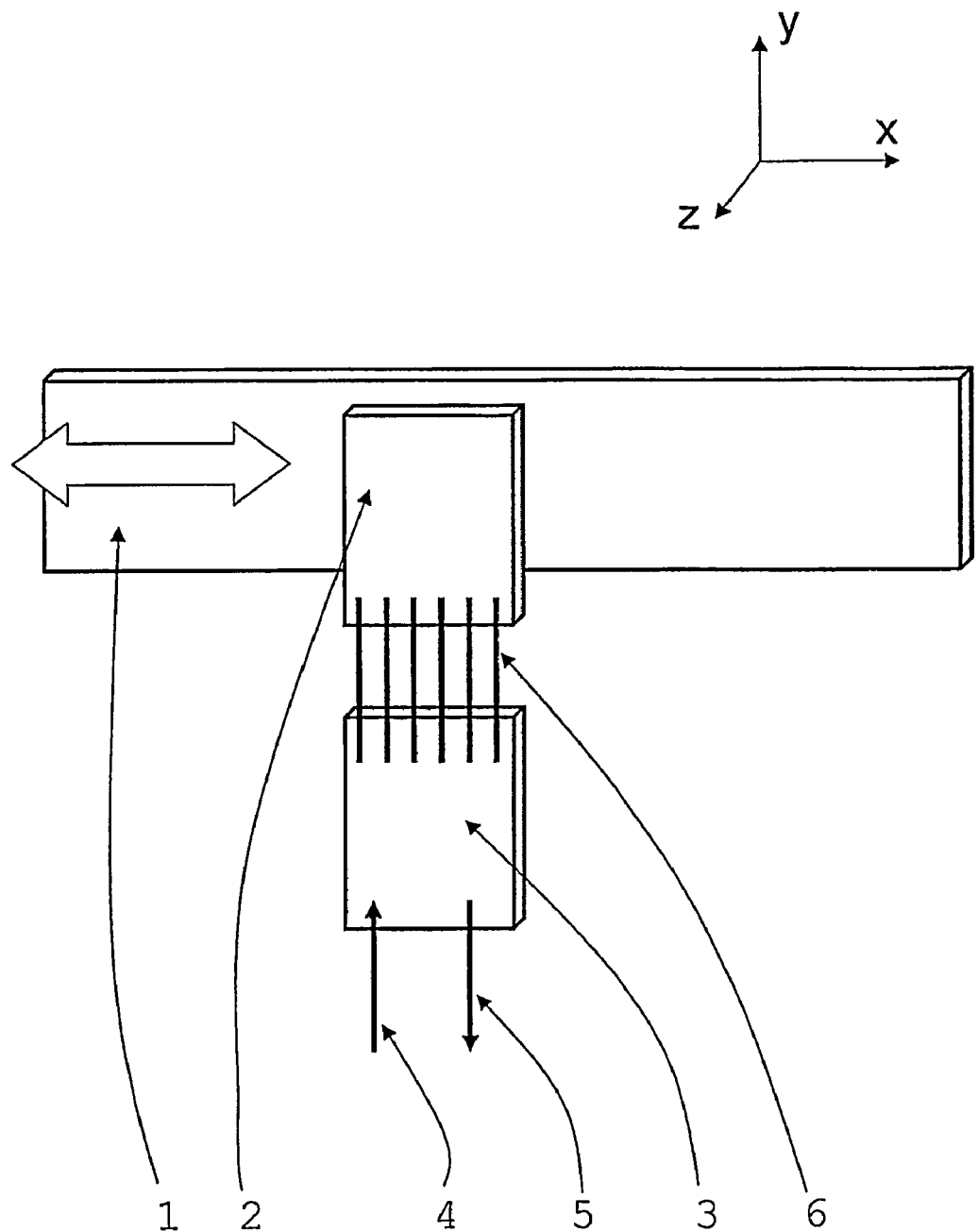
FIG. 1 shows a simplified linear form of the detector.

FIG. 1 shows a schematic of the invention's main elements in which an electrical intermediate device [1] co-operates with an antenna [2]. In a preferred embodiment the electrical intermediate device [1] and antenna [2] are used to detect the relative displacement of the bodies which they are attached to. The bodies are arranged so as to move principally in a single linear axis (x) although it is important to note that the invention is not restricted to linear motion. The antenna [2] is electrically connected to an electronic circuit [3] via a multiplicity of interconnecting conductors [6]. The electronics circuit [3] is energised by an electrical power supply [4] and outputs electrical data in accordance with the relative position of the electrical intermediate device [1] and antenna [2]. The antenna's [2] transmit winding is energised with an AC signal at substantially the same frequency as the resonant frequency of the electrical intermediate device [1]. Electrical outputs from the electronic circuit [3] can be, for example, serial data such as RS232, voltage such as 0-5 VDC or current such as 4 . . . 20 mA which are proportional to the position of the electrical intermediate device's [1] position relative to the antenna [2] along the measurement (x) axis. A power supply of 5 VDC with a current of 10 mA is preferable. Preferably the electrical intermediate device [1], antenna [2] and electronics circuit [3] are constructed from a single sided printed circuit board such as 1 mm thick CEM1 with 1 ounce copper tracking. Cross overs may be formed by the use of surface mount 0 ohm resistors or conductive ink marks over printed dielectric. Preferably the printed circuit boards are protected from humidity and fluids with a sprayed conformal coating such as Plastic Seal 60 from Servisol Ltd. of Bridgwater, Somerset, England.

Figure 2:
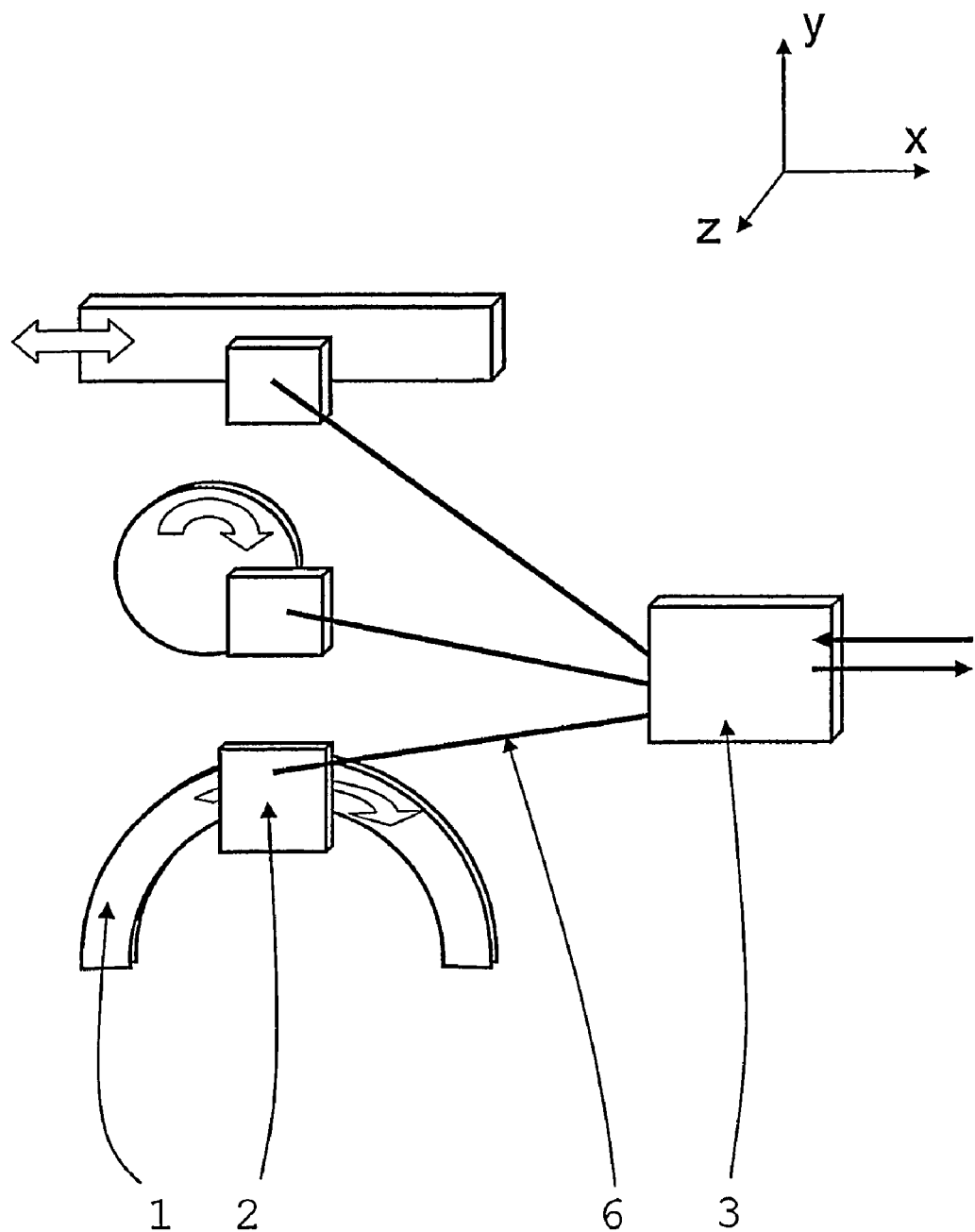
FIG. 2 shows a linear, rotary and curvi-linear form of the detector controlled by a single electronic circuit.

FIG. 2 shows a schematic of a network of antennae [2] and electrical intermediate devices [1] of various shapes and sizes. Each of the antennae [2] is energised by a single electronics circuit [3] via a multiplicity of interconnecting conductors [6]. Each of the antennae [2] and electrical intermediate device [1] sets have their own resonant frequency, for example 1 MHz, 2 MHz and 3 MHz, and the excitations, signal receptions and resulting position calculations for each detector can be made as the excitation frequency steps through a pre-programmed sequence.

Figure 3:
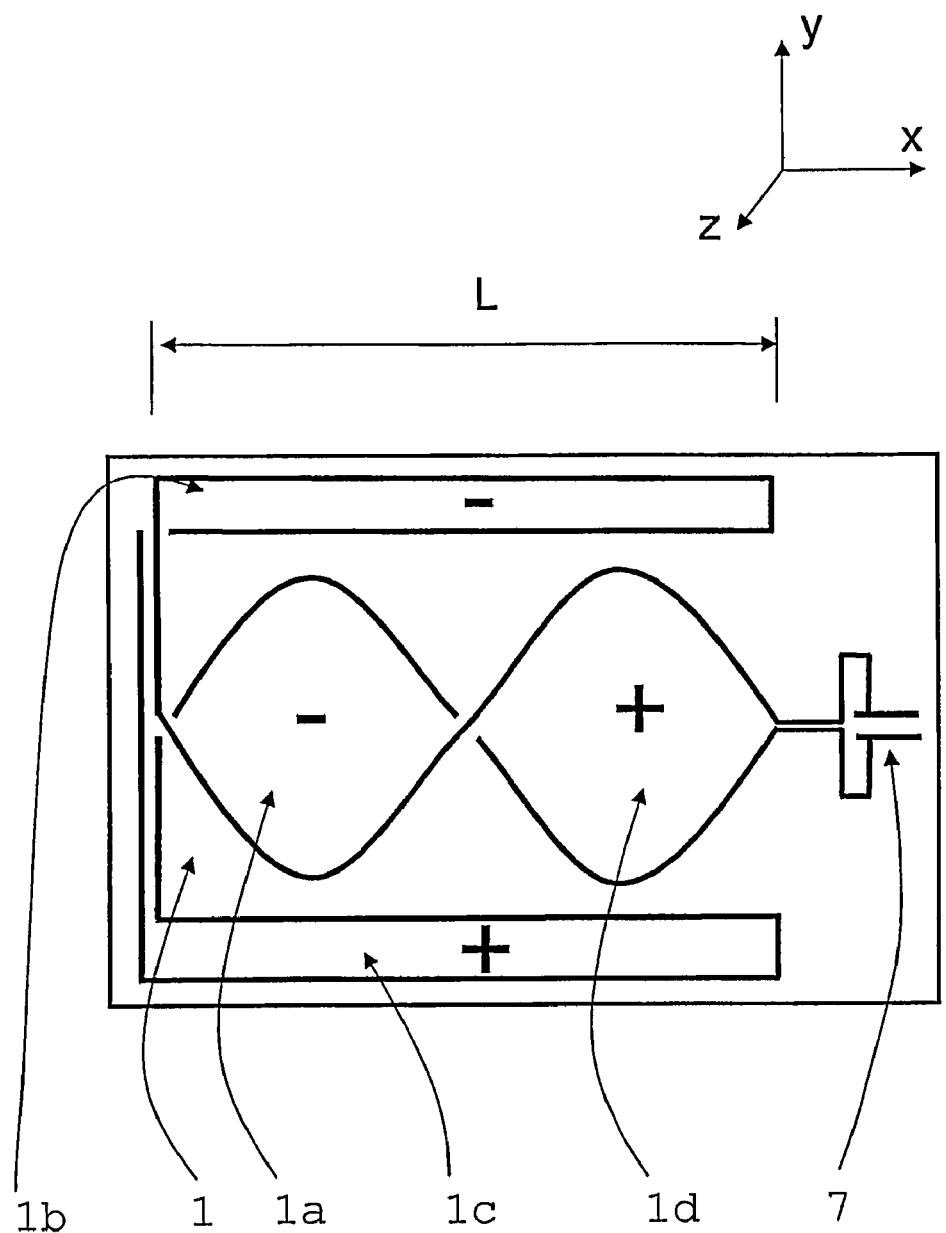
FIG. 3 shows a schematic arrangement of the electrical intermediate device's resonant circuit.
Figure 4:
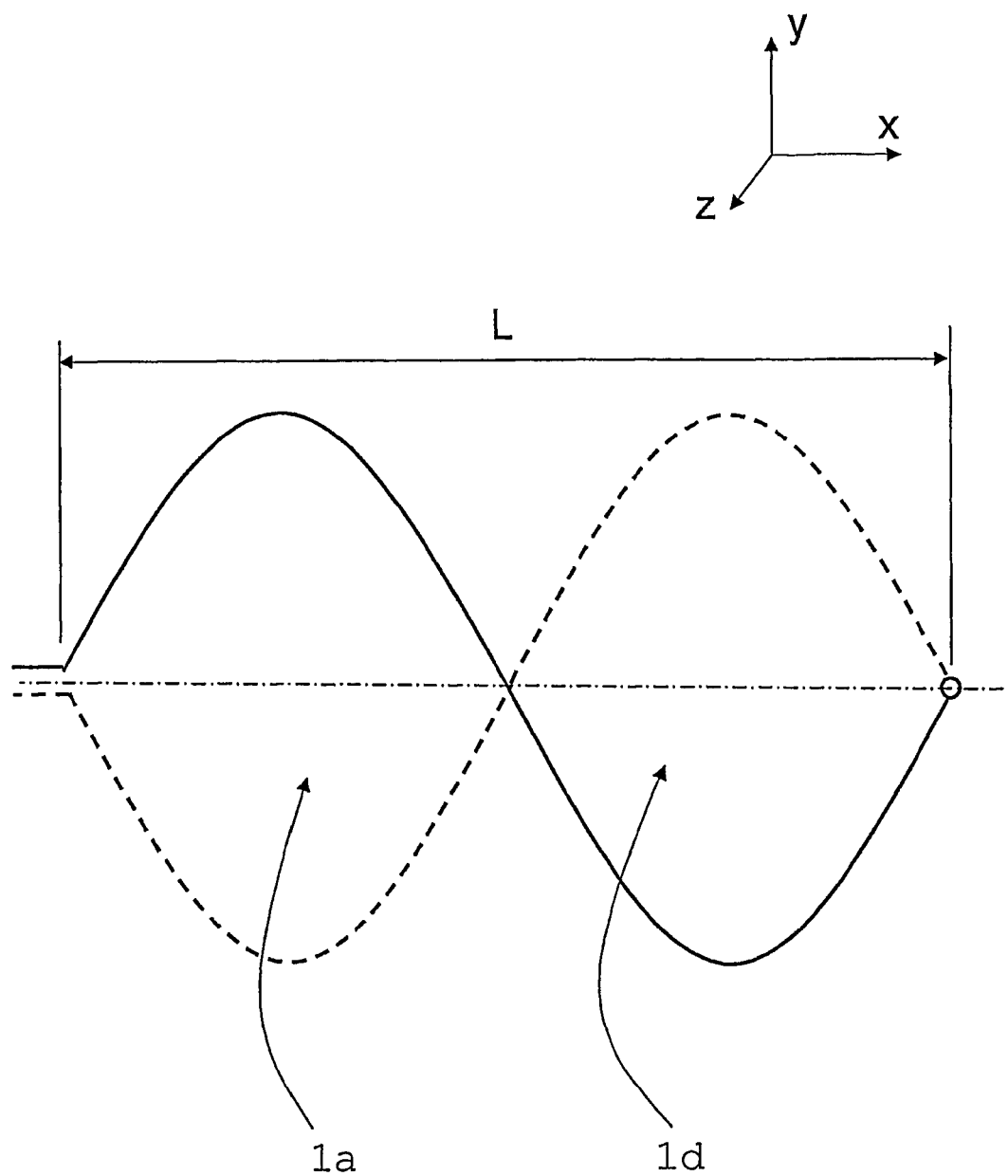
FIG. 4 shows a schematic arrangement of the electrical intermediate device's inductor.

FIG. 3 shows a schematic of the electrical intermediate device [1] which contains an inductor in 4 loops or winding portions [1a, 1b, 1c & 1d] connected in electrical series with a capacitor [7]. The electrical intermediate device [1] is shown elongated in the y-axis for reasons of clarity. The circuit forms a resonant circuit with a natural resonant frequency preferably in the range 100 kHz-10 MHz. The central loops [1a & 1d] vary in the y-dimension or width measured transversely to the measurement axis (x). Considering the variation in width as a sinusoid of period L, the inductor windings are first wound in a clockwise direction from the start of the sinusoid to L/2 and then reverse direction from L/2 to L as shown in FIG. 4. For reasons of clarity, FIG. 4 shows a double sided construction with a single plated via hole at the end of loop of conductive track forming connections between the upper and lower surfaces of the printed circuit board. Referring back again to FIG. 3, loops 1b and 1c have a constant width measured transverse to the measurement axis but are wound in opposite directions so as to achieve electrical balance with respect to any far field emissions for reasons of good electromagnetic compatibility. Further, this aids the design and arrangement of the transmit and receive windings [2a, 2b, 2c & 2d] as described below. Preferably the electrical intermediate device [1] is produced from a single sided printed circuit board such as CEM1 with copper tracking. Cross overs may be attained by the use of 0 ohm resistors or conductive ink marks over printed dielectric. The capacitor [7] is preferably a high stability (COG) type and is preferably attached using surface mount adhesive and soldering methods.

Figure 5:
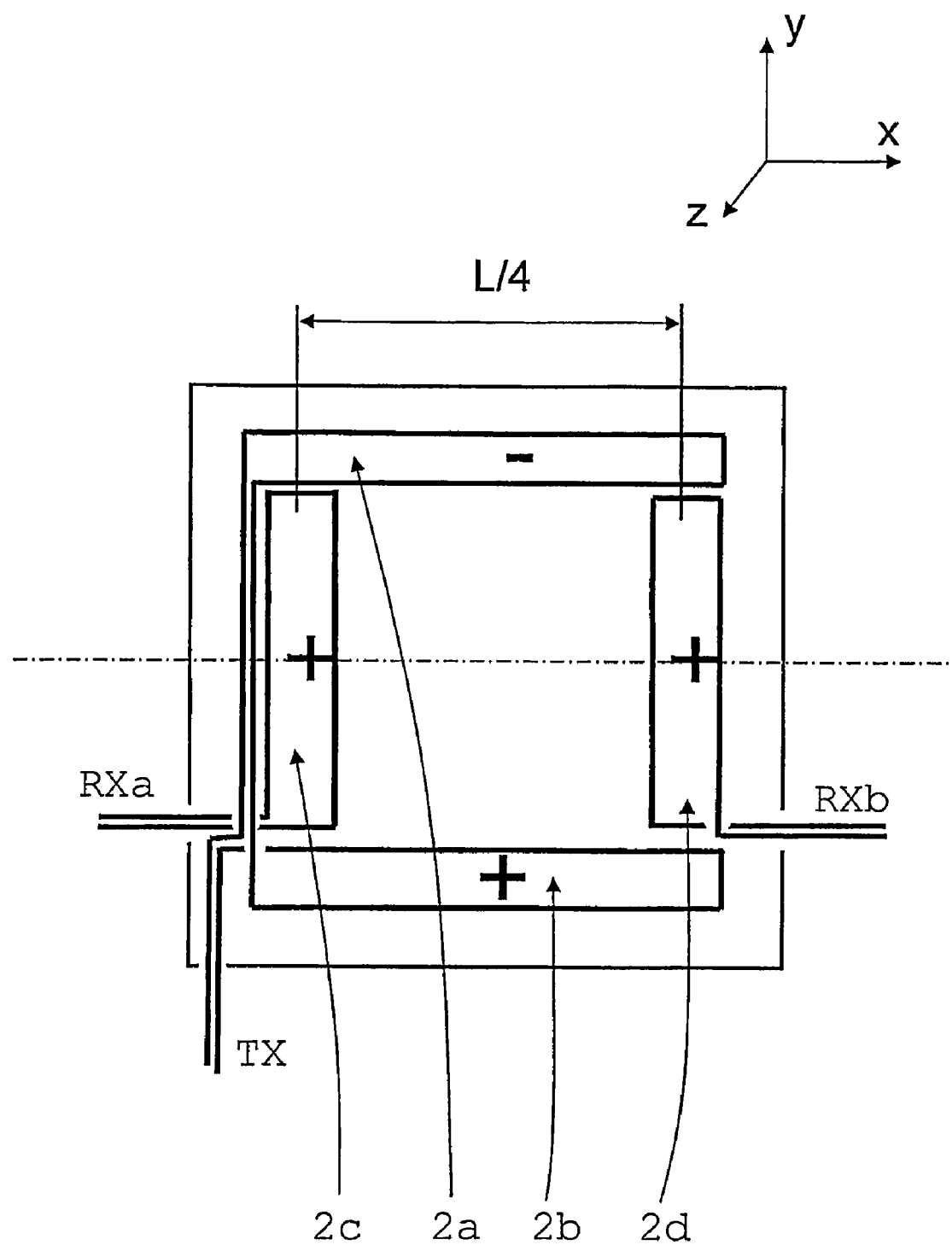
FIG. 5 shows a schematic arrangement of the antenna's transmit and receive windings.

FIG. 5 shows a schematic of the antenna [2] which preferably contains a transmit circuit (TX) with loops 2a and 2b as shown and two receive circuits [2c & 2d] (RXa) and (RXb) which are spaced apart along the axis of movement x by a distance of L/4 where L is the winding pitch of the electrical intermediate device winding [1a & 1d]. The transmit circuit [2a & 2b] is energised with an AC signal from the remote electronics circuit [3] at substantially the same resonant frequency as the electrical intermediate device [1]. An alternating electromagnetic field is formed around the transmit circuit [2a & 2b]. When the electrical intermediate device [1] enters the electromagnetic field, currents are induced to flow in its circuit which, in turn, generate their own alternating electromagnetic field. This field induces a voltage in the antenna's receive circuits [2c & 2d]. The frequency of this voltage is indicative of the electrical intermediate device's [1] identity. The ratio of the voltages induced in the two receive circuits [2c & 2d] is indicative of the position of the electrical intermediate device [1] relative to the antenna [2]. The two receive windings [2c & 2d] are simple loops which spatially overlap the sinusoidally varying cross-section loops of the electrical intermediate device [1b & 1c]]. The transmit winding [2a & 2b] is constructed of two sections, connected in series, which overlap the constant cross section portions of the electrical intermediate device [1]. These two circuit sections are wound in opposing direction to maximise coupling to the electrical intermediate device [1]. In addition, the transmit winding [2a & 2b]] is now balanced with respect to each of the receive windings [2c & 2d] and also to far field emissions so maximising electromagnetic compatibility. It is important to balance the transmit and receive windings [2a, 2b, 2c, 2d] with respect to each other so that no net signal appears at the receive winding [2c & 2d] in the absence of the electrical intermediate device [1], which would lead to erroneous measurement.

FIG. 5 shows a relatively simple layout of the windings with lots of unused PCB area for reasons of clarity. As will be appreciated by those skilled in the art, such a layout would, in practice, be wasteful and overly expensive. In practice, it is useful to minimise the area of PCB required and this can be achieved by overlapping the receive windings [2c & 2d] with the transmit windings [2a & 2b] with each group arranged on separate sides of the PCB. Similarly the constant and varying portions of the electrical intermediate device [1] would be placed on opposite sides of the PCB to permit overlapping and hence minimize PCB area and hence cost. In such an instance it is advantageous to have the constant width portions of the electrical intermediate device [1] wound in opposite directions so as to have no net coupling to each receive winding [2c & 2d].

Figure 6:
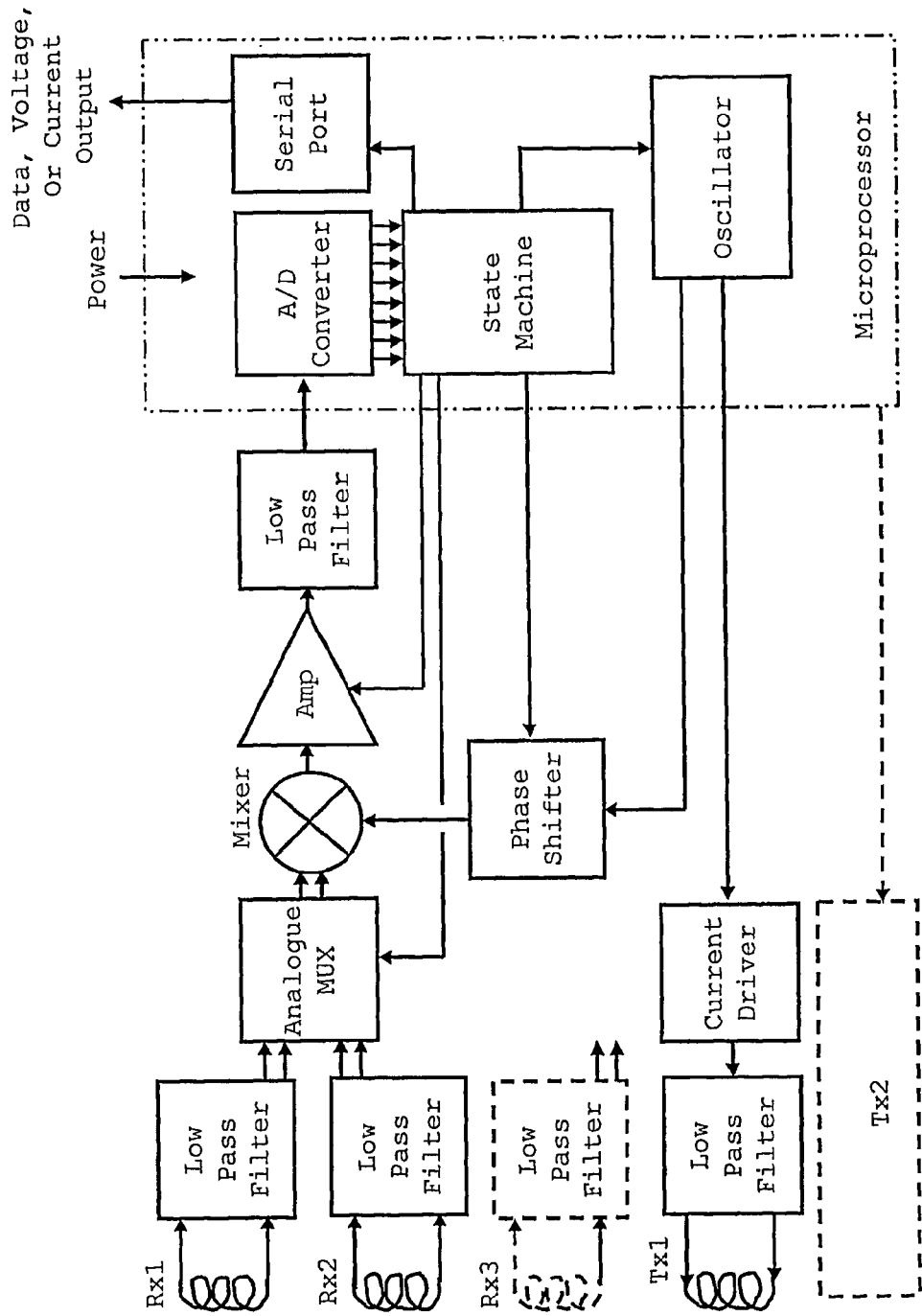
FIG. 6 shows a schematic of the detector's electronic circuit.

FIG. 6 shows a schematic of the electronic circuit [3] which is largely self explanatory. Since the signal in the first receive winding RXa is proportional to sin(x) and the signal in the second receive winding RXb is proportional to sin(L/4+x), which is equivalent to cos(x), then position 'x' can be obtained from the equation (L/2pi)*ARCTAN(RXa/RXb). The power supply may pass through an over voltage protection circuit if voltage spikes are possible from the electrical supply. Reverse polarity protection is also a common requirement. Typical power requirements are 5V at 10 milliamps at a 100% duty cycle. The output signal may be produced in a variety of formats such as 0-5V, 4 . . . 20 mA or, preferably, a serial data stream such as SPI so that no errors are introduced as a result of analogue to digital conversion or vice versa. Preferably the circuit [3] is constructed either from an application specific integrated circuit, a hybrid circuit or a circuit of surface mount electronics soldered to the same printed circuit board as the antenna [2] with a short distance between the circuit and the antenna's [2] windings. Advantageously, the electronic circuit [3] should have a memory so that calibration of other data may be stored. Advantageously, such calibration data may be generated by a second, higher accuracy detector, such as a high-precision optical or laser system, whose readings may then be used to improve the linearity, for example, of the detector's measurements.

MODIFICATIONS AND FURTHER EMBODIMENTS

Previously, FIG. 2 was described which shows a schematic of a network of antennae [2] and electrical intermediate devices [1] of various shapes and sizes. Each of the antennae [2] is energised by a single electronics circuit [3] via a multiplicity of interconnecting conductors [6]. Further, a preferred embodiment was described in which each electrical intermediate device [1] has its own resonant frequency with the resulting position calculations for each detector made as the excitation frequency steps through a pre-programmed sequence. Alternatively, time division multiplexing of the transmit and receive connections between antenna [2] and electronics circuit [3] at a single frequency can be employed.

Figure 7A:
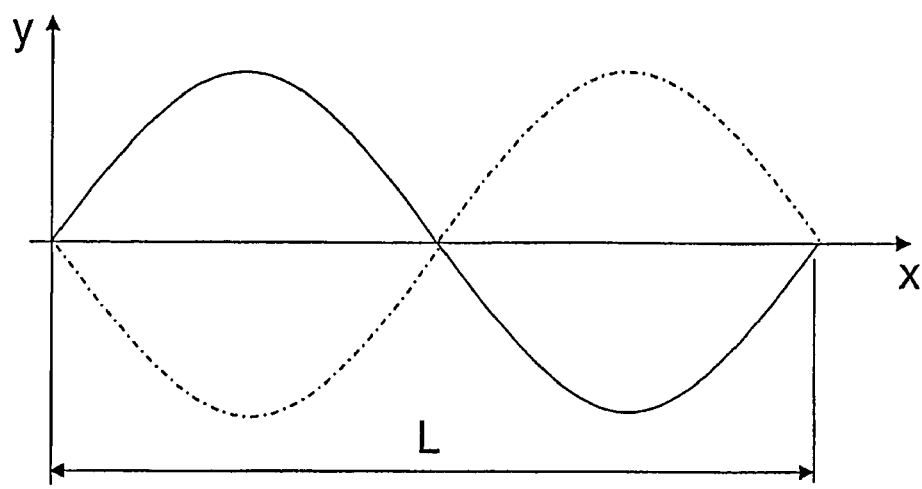
FIGS. 7a, 7b, 7c & 7d show various winding arrangements of the electrical intermediate device's inductor.

FIG. 7a shows a schematic of the width varying loops [1a & 1d] of single pitch inductor winding. The inductor's width in the y-axis varies sinusoidally along the pitch length L. The first part of the inductor from x=0 to x=L/2 is wound in one direction and the second part from x=L/2 to L is wound in the opposite direction.

Figure 7B:
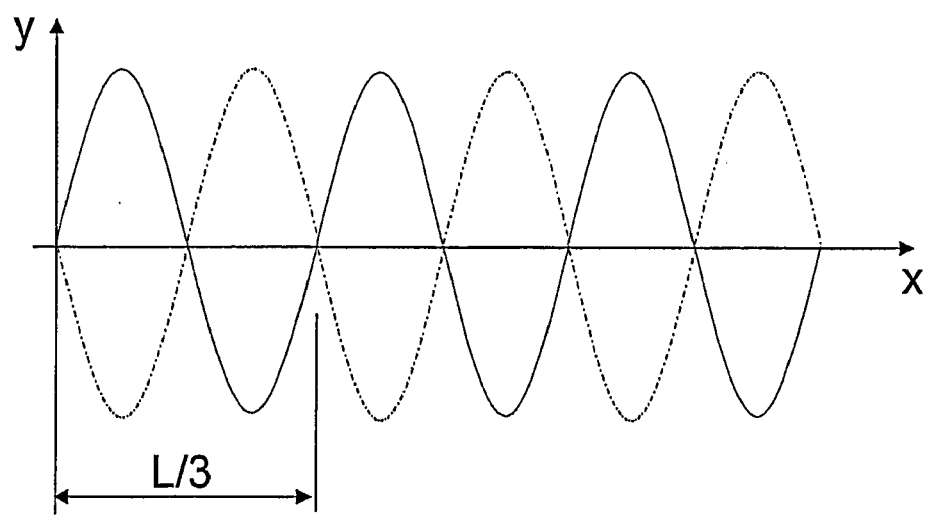
Figure 7C:
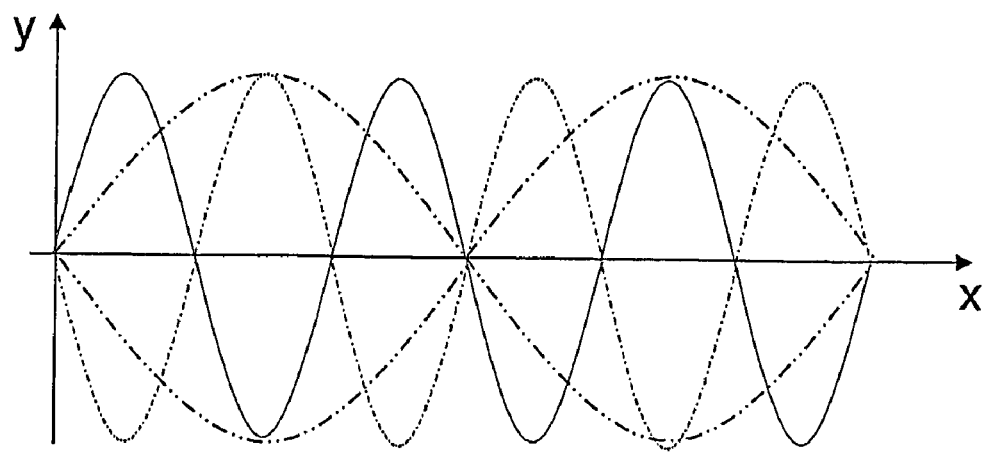

Measurement resolution can be improved by the use of multiple pitch windings as shown in FIG. 7b. If, for example, an electronics circuit [3] produces measurement resolution of 10 bits over a full scale of L this can be improved by arranging the electrical intermediate device's [1] windings [1a & 1d] in to multiple pitches of <L. For example, if the windings [1a & 1d] are arranged in 3 pitches each of length L/3 then the measurement resolution will be equivalent to 10 bits over L/3, in other words a 3-fold improvement in measurement resolution.

One draw back of multi-pitch arrangements is that the measured position is ambiguous rather than absolute. Absolute position measurement can be achieved by the use of a second, coarse pitch arrangement extending over the full scale as shown in FIG. 7e. This is achieved at a minimum by having a third receive winding, separated from one of the others by L/4 of the coarse pitch, and a second coarse pitch electrical intermediate device [1]. This second resonant circuit should either be at substantially the same frequency as the first and spatially displaced away so as not to interfere with the original measurement or have a second resonant frequency. In using a second circuit a fine pitch measurement can be produced by measurement at the first frequency and a second coarse measurement at the second frequency. The two measurements may be combined electronically or in software to produce a high resolution, absolute position measurement. The optimal choice between the use of either a spatially separated coarse pattern with the same frequency or a coarse pattern with a different frequency (where the patterns are not necessarily separated) is chiefly determined by the specific application's space and cost constraints. Where large areas of circuit board might be required to produce spatially separated windings it is preferable to use different frequencies.

Figure 7D:
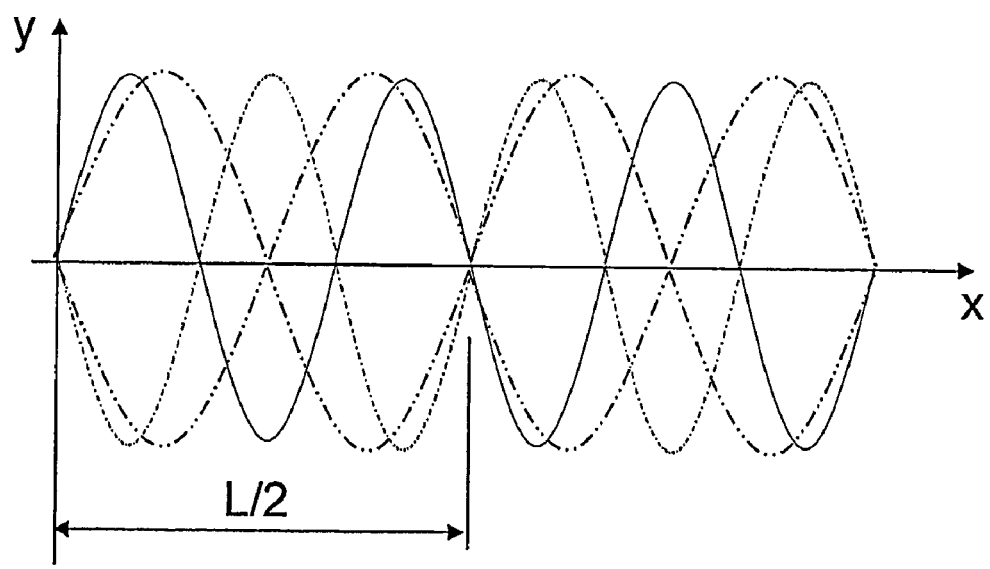

A first alternative scheme to coarse and fine pitch winding arrangements is the use of a Vernier technique. A schematic of such an arrangement is shown in FIG. 7d. This technique uses two or more multi-pitch windings in the electrical intermediate device [1]. For example, a first winding of pitch L/3 is used with a second winding of pitch L/2. The ambiguous readings from each electrical intermediate device can be combined so as to provide a unique indication of position. The unique indication will be preserved up to the lowest common multiple of the winding pitches. In this example the lowest common multiple is L. As with the use of a coarse and fine pattern technique the windings may either be spatially separated or have different frequencies. For purposes of clarity FIG. 7d shows only use of different frequencies. The use of a Vernier technique is of particular utility in the production of linear detectors where it is necessary to provide a range of different measurement lengths. For example, if we consider a range of linear detectors to provide measurement over up to 1000 mm of full scale travel then a Vernier pairing of 35 and 36 mm can be arranged in a unique pattern over distances of >1000 mm. An arrangement can be readily produced for the longest scale required and simply cut down or produced to the required size. This can be done physically with a cutting tool and an end connector or in software creating a pattern for the requisite electrical intermediate device's [1] printed conductors. This technique minimizes the amount of re-design, re-engineering and re-tooling needed for every length that might be required. Furthermore, a single design of antenna [2] and electronics [3] can be used for all the various lengths which reduces production costs by simple economy of scale. If the measurement scale requires that the Vernier pairs are quite long in order to avoid ambiguity then the measurement resolution will be reduced. This can be resolved by the use of further sets of windings at a finer, repeating or ambiguous pitch. These can be used in conjunction so that the Vernier arrangement produces a coarse and absolute position measurement with the repetitive windings producing a fine resolution but ambiguous measurement over the full measurement range.

A second alternative to enable high resolution measurement over extended scales can be achieved with the use of a reed or Hall switch for example. In such an instance a magnet is attached to the electrical intermediate device [1] which triggers the reed or Hall switch to signify that, for example, a second area of the electrical intermediate device [1] is in operation.

There is a third alternative to enable high resolution measurement over extended scales. This can be achieved with the use of a repetitive winding pitch over a long distance with fundamentally incremental position measurement but wherein the electronic circuit [3] counts the number of cycles so as to provide an absolute signal. This count can be checked against a shorter electrical intermediate device at a second frequency placed along the multiplicity of repetitive windings. Periodically when the antenna [2] and electronics circuit [3] passes over the shorter electrical intermediate device the count may be checked and rectified in software if necessary.

The overall winding pattern may be extended beyond a single period L, at both ends, to improve the linearity at the ends of a linear device.

The shape of the width variation of the circuits on the electrical intermediate device need not be sinusoidal. The width variation may be triangular, circular or other such shape.

Other higher harmonic components may be added to the sinusoidally varying part of the electrical intermediate device to improve linearity. This may be necessary, for example, to account for the disturbing effect of a metal part in the detector's near field.

Figure 8:
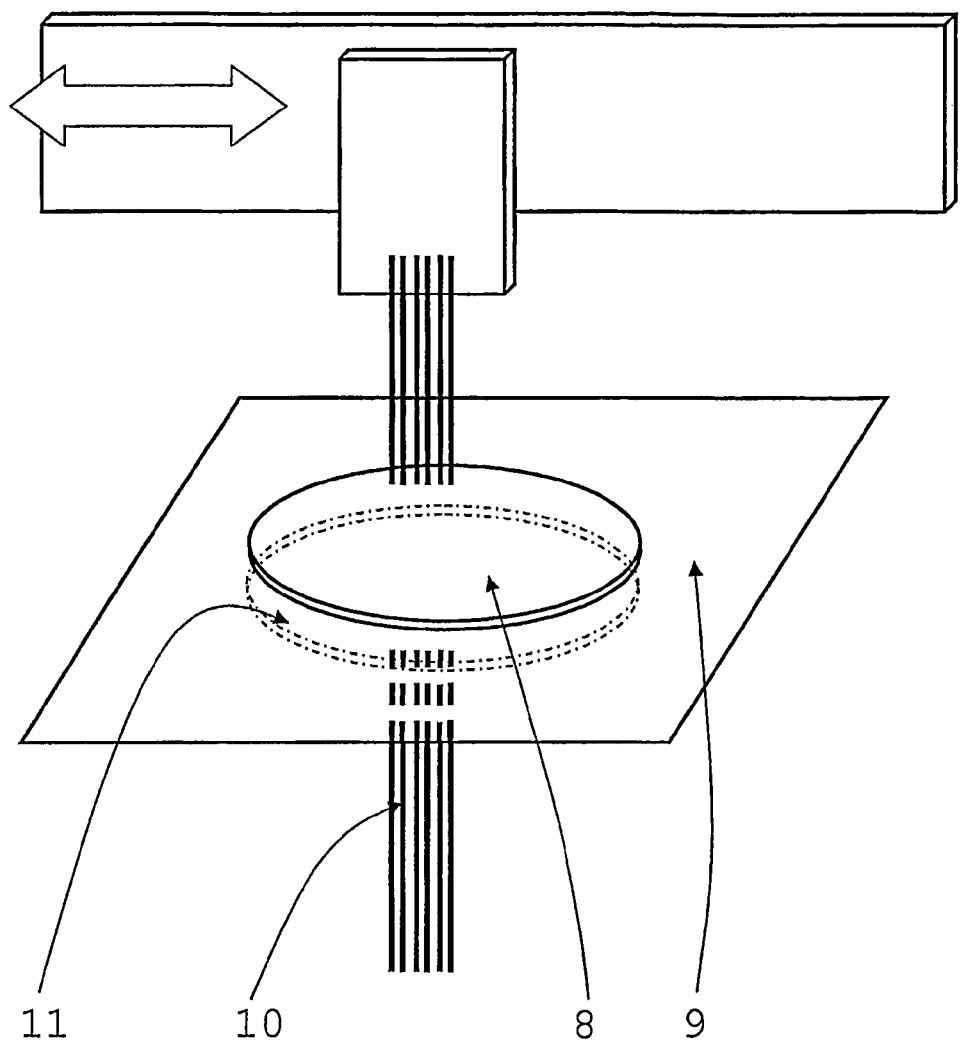
FIG. 8 shows a linear form of the detector with a transformer coupling across a membrane.

FIG. 8 shows a linear form of the detector in which the electrical connections [10] to the antenna [2] cross a membrane [9] without mechanically perforating it. The arrangement has particular use in pressure vessels or vessels containing liquids where perforations or holes in the vessel wall are preferably avoided. The electrical cables [10] are each connected to a set of primary windings [11] of a transformer on the first side of the membrane [9]. The electrical signals are carried across the membrane [9] to the transformer's secondary windings [8] on the second side of the membrane. Preferably the transformer windings [8 & 11] are embodied as spiral tracks on a printed circuit board.

A further advantage of such transformer constructions is that the antenna [2] may move freely without trailing electrical wires and connections. For example, both an antenna [2] and corresponding electrical intermediate device [1] may be arranged on a rotating shaft to measure the twist between two points of a shaft as a way of measuring applied torque. Displacement of the electrical intermediate device [1] may be detected by the antenna [2] which is powered via a transformer [8 & 11]. Preferably, the transformer's primary windings [11] are on a stationary part of the assembly and the secondary windings [8] are on the rotating parts of the assembly. The received signals in the antenna [2] are sent back to the host electronics [3] via the transformer [8 & 11]. Such arrangements are particularly useful in steering columns where applied torque and steering may be measured. In order that the shaft twists a sufficiently large distance to be measured it can be slotted. Small angular twists are preferably measured using a multi-pitch arrangement of antenna [2] and electrical intermediate device [1].

Figure 9:
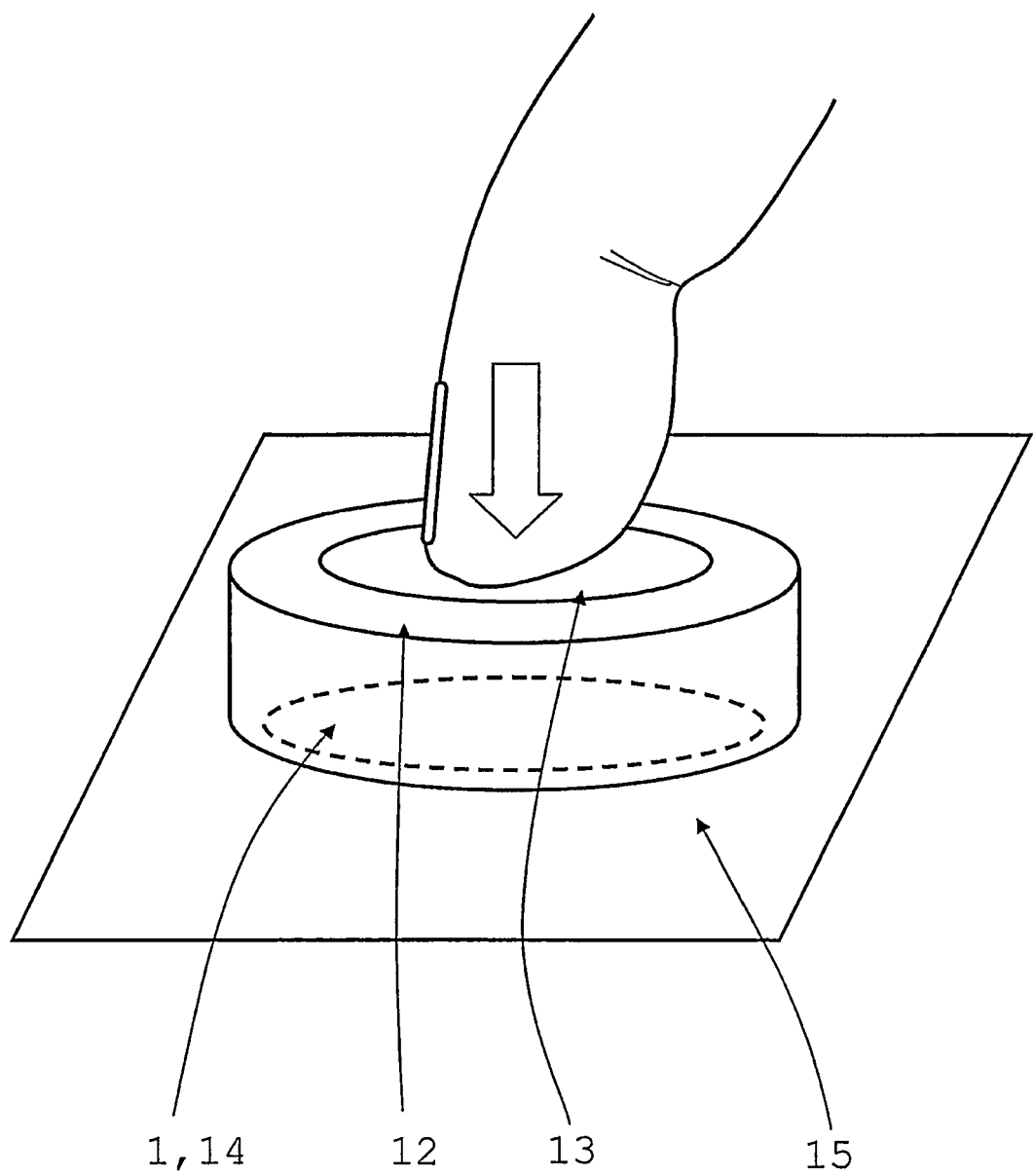
FIG. 9 shows an electrical intermediate device with a push-button switch.

FIG. 9 shows a rotary user element [12] with a push button switch [13]. Such an arrangement might be used, for example, in a user interface so that a user might scroll through a menu structure in a graphical user interface and make a selection. The user element [12] is operable to rotate under the action of a user. The user element [12] contains a rotary electrical intermediate device [1] whose position is measured by an antenna (not shown) positioned on the underside of an impermeable fascia panel [15]. The electrical intermediate device [1] also contains a push button switch [14] which is normally open but closed under the action of a user depressing the push button [13]. Such an arrangement is advantageously deployed when the transmission of switch status is required to be communicated in a non-contact fashion, for example, through an impermeable membrane containing a fluid or providing a hermetic seal. Advantageously, the user element [12] may be held against the fascia panel [15] under the action of two or more magnets—the first in the user element [12], the second in or beneath the fascia panel [15]. In such an arrangement the user element [12] may be readily removed so that an impermeable fascia [15] is left to facilitate ease of cleaning or sterilisation and during which no ingress of fluid to the host equipment is possible. Further user interaction with the host equipment is prevented which is useful in preventing accidents caused by improper use by children, vandals or untrained personnel. Additional magnets may be used to provide tactile feedback as the user element [12] is operated.

Figure 10:
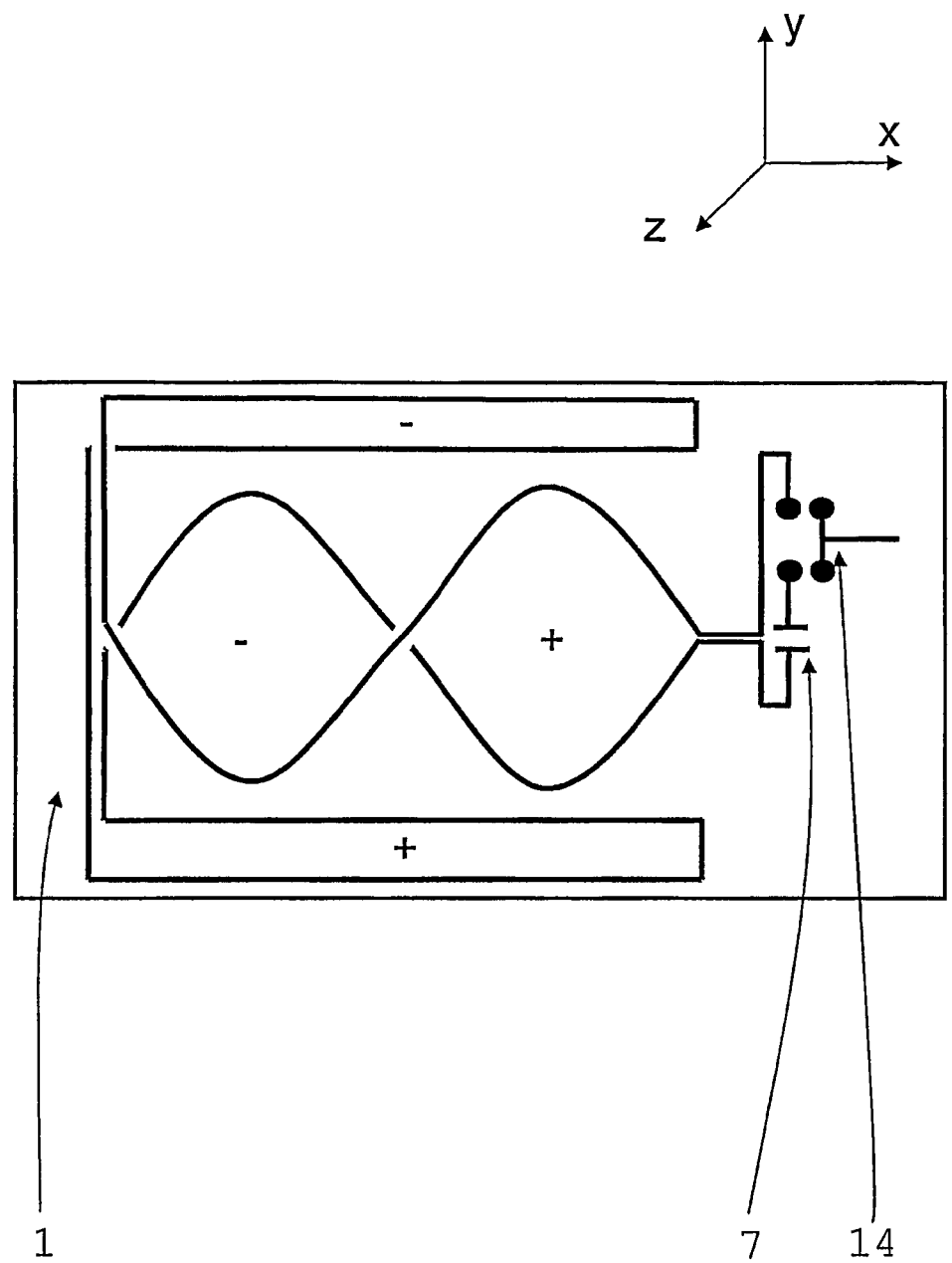
FIG. 10 shows a simplified electrical schematic of an electrical intermediate device with a push-button switch.

FIG. 10 shows an electrical schematic of a non-contact method of transmitting switch status similar to the system described in FIG. 9. A normally open switch [14] is arranged in electrical series with the electrical intermediate device's capacitor [7] and inductor. When a local antenna [2] (not shown) is energised, currents will be unable to flow in the electrical intermediate device [1] because of the open circuit. No return signal will be received by the antenna [2]. When the switch [14] is closed, currents will flow and the antenna [2] will receive a signal. In this way it is possible for data regarding switch [14] position to be transmitted in a contactless manner. Data regarding multiple switches may be provided by using multiple resonant circuits of different resonant frequencies. Alternatively, the switches [14] can be used to switch in other capacitors [7] or inductors so as to alter the natural frequency of the electrical intermediate device [1] and hence provide data.

Figure 11A:
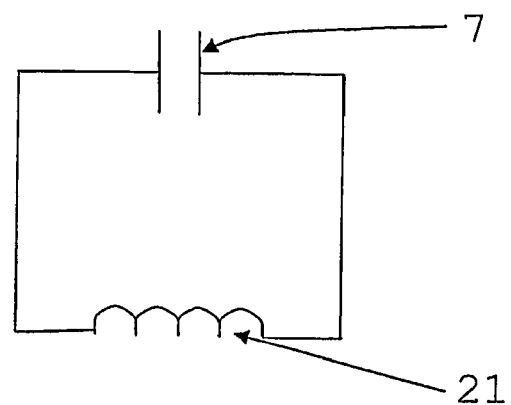
FIGS. 11a, 11b, 11c, 11d, 11e & 11f show various arrangements of electrical intermediate device so that they may be used as a method of identification.
Figure 11B:
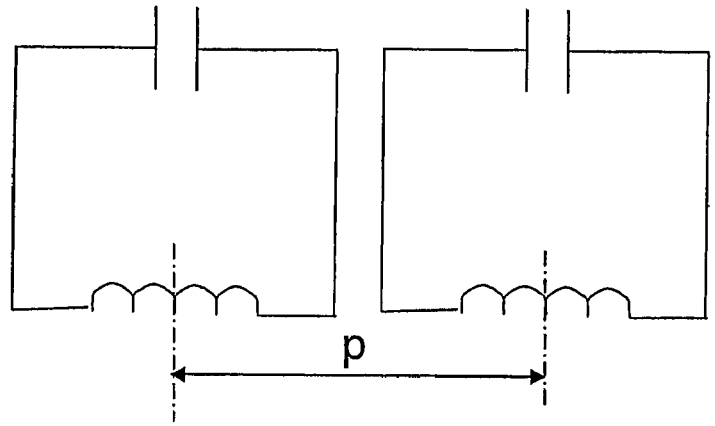
Figure 11C:
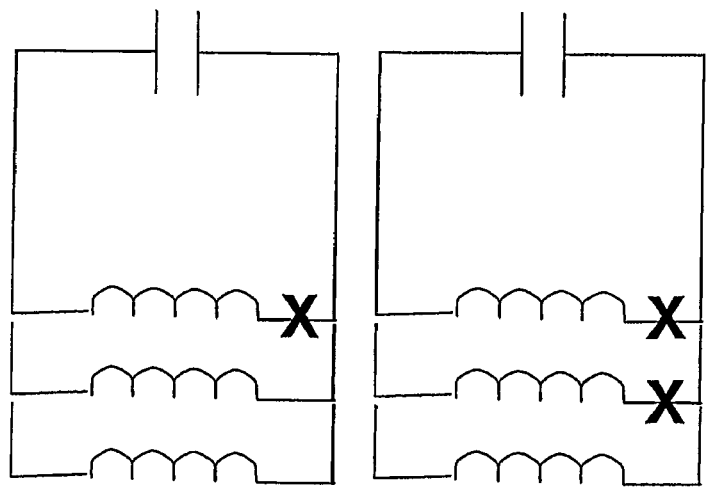

FIGS. 11a, 11b & 11c show schematic methods of encoding identities on to electrical intermediate devices.

In FIG. 11a an inductor [21] and capacitor [7] are arranged in electrical series to form an electrical intermediate device [1]. Varying either the capacitor [7] or inductance [21] will vary the resonant circuit's natural frequency. This can be used as a way of encoding identity against a predetermined set of identities and frequencies held in the electronic circuit's [3] memory. Typically, a practical range of possible frequencies will be limited to about 10, so that inherent frequency variation can be tolerated and frequency harmonics avoided.

In FIG. 11b 2 resonant circuits are provided. In this way the combination of potential resonant frequencies increases the practical number of possible identities. Further, by varying the distance between the circuits, p, this non-frequency based variable increases the range still further. Large numbers of identities can be encoded with the use of more than 2 electrical intermediate devices [1] and 2-dimensional (in x & y-axes) sensing of relative displacement.

FIG. 11c shows a schematic of a resonant circuit with inductors [21] in parallel. By obliterating part of the winding of one or more of the inductors [21] at positions marked X then the circuit's inductance is altered and, in turn, the resonant frequency. This can be readily performed using a computer numerically controlled printed circuit board drilling machine and is an alternative method of varying a circuit's frequency compared to changing the value of the capacitor [7]. In this way, resonant circuits can be produced in bulk from a small number of PCB's and capacitors [7] and then tailored to requirements at point of delivery.

Figure 11D:
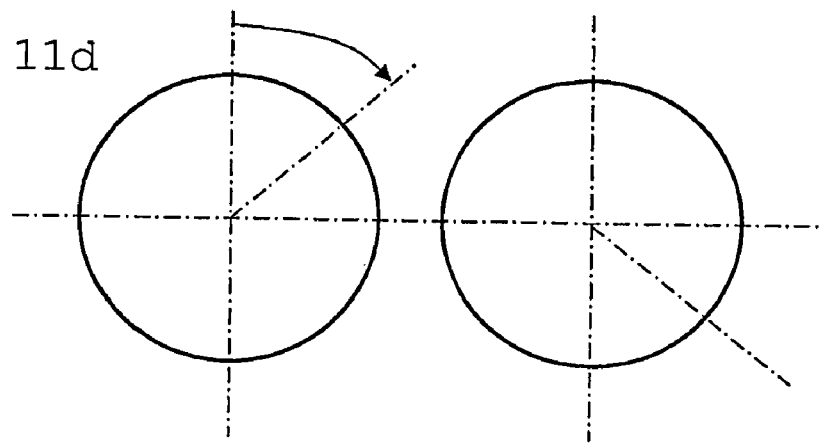
Figure 11E:
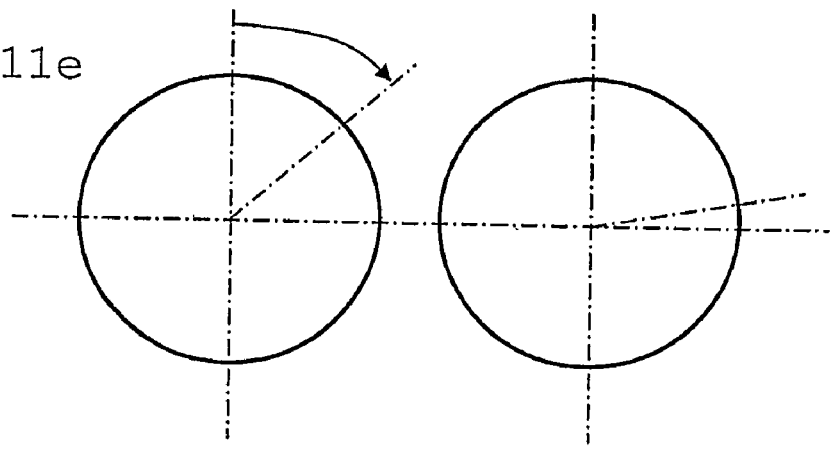
Figure 11F:
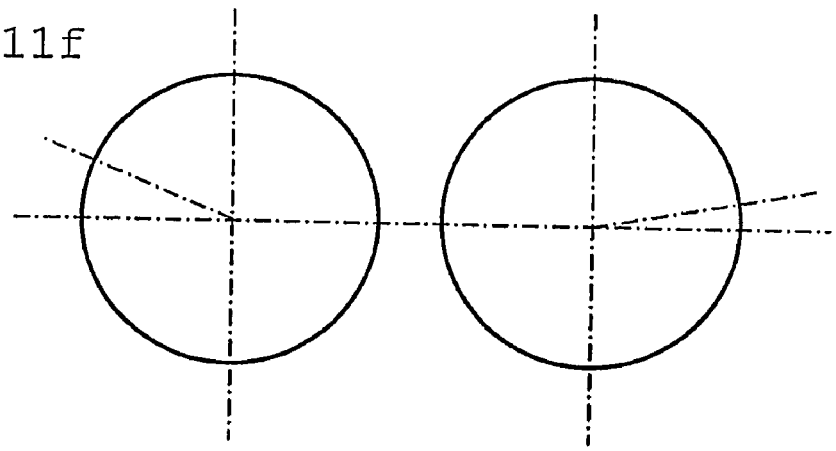

FIG. 11d shows the use of 2 rotary electrical intermediate devices [1] whose centre distance is constant but whose rotary position can be varied. By way of example, we may consider the use of 2 electrical intermediate devices [1] of the same frequency whose rotational position can be measured by 2 electrically separate antennae [2]. If each of the rotary electrical intermediate devices [1] can be set to one of 36 positions then the total number of identities=36×36=1296.

Figure 12:
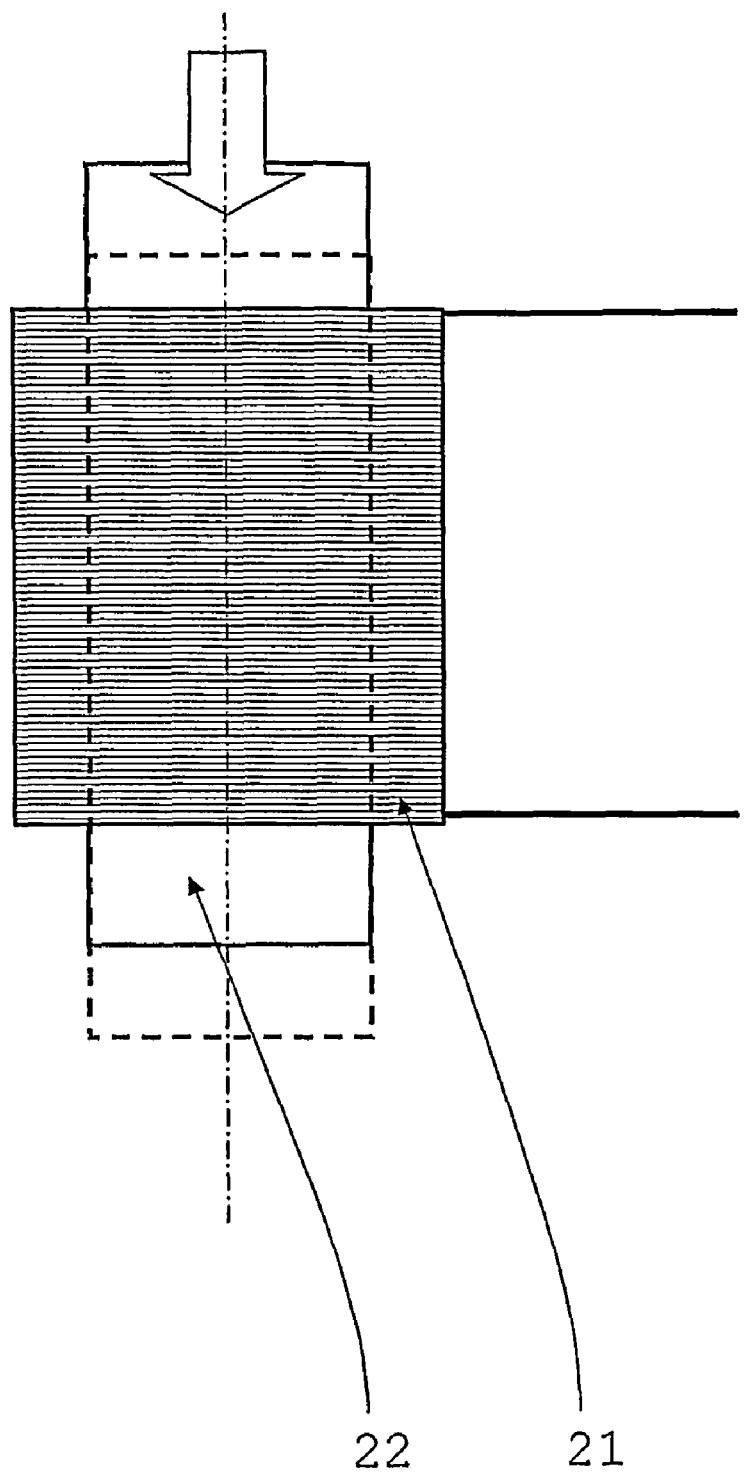
FIG. 12 shows part of an electrical intermediate device's conductor with a magnetically permeable core which is operable to displace relative to the inductor so that its inductance changes.

FIG. 12 shows an alternative arrangement to provide data. In some applications it may be undesirable to use an electrical switch [14]. For example in wet or dirty environments a switch [14] may be unreliable due to foreign matter or fluid ingress at the electrical contacts. In such instances data may be provided by changing the inductance value of part of the inductor [21] in the electrical intermediate device [1]. FIG. 12 shows part of the electrical intermediate device's inductor [21] wound in to a coil. A magnetically permeable element [22], preferably a ferrite cylinder is arranged so that, if it is pressed, it moves along the main axis of the winding [21] and causes a change in the winding's inductance. This will be detected as a shift in the resonant frequency of the electrical intermediate device.

Figure 13:
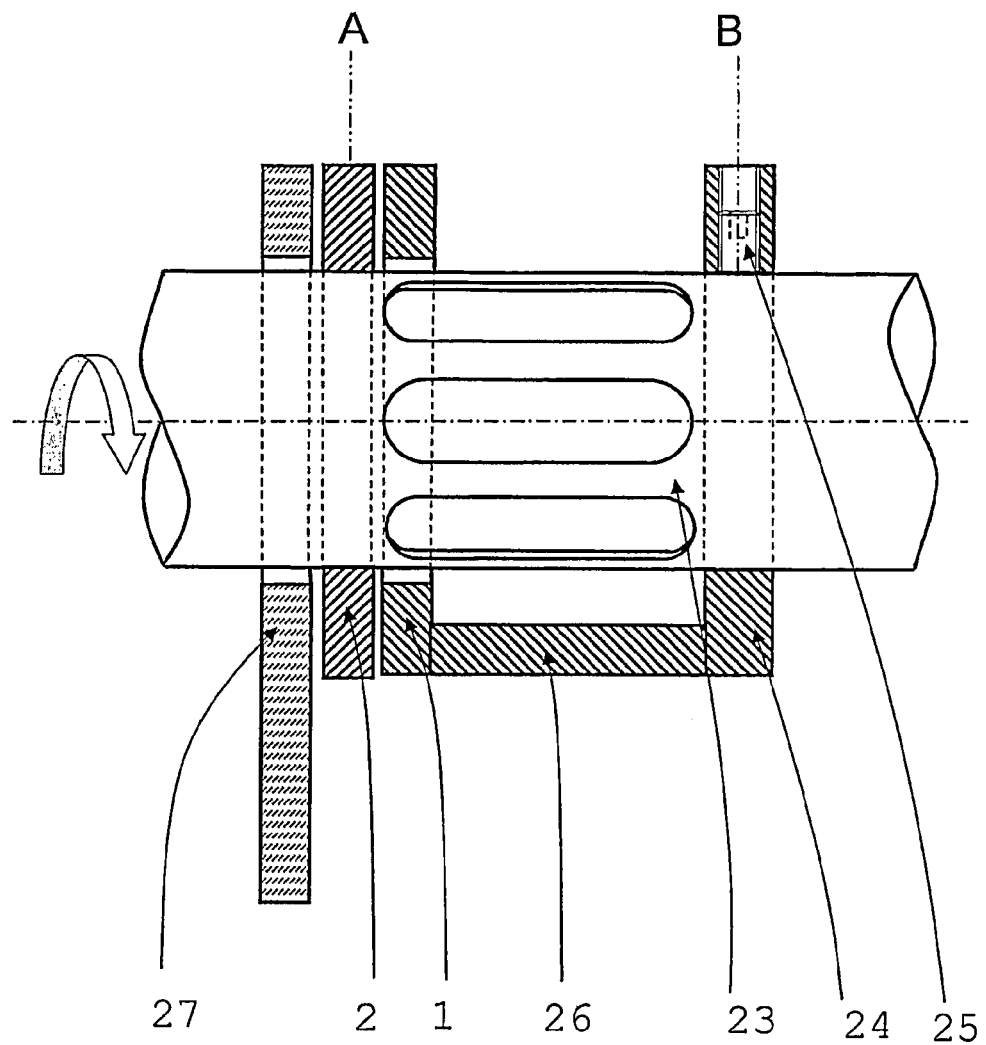
FIG. 13 shows an arrangement for measuring torque in a shaft which uses a transformer winding to energise and receive signals from the antenna.

FIG. 13 shows a sectional schematic of the invention's main elements co-operating with a rotating shaft [23] so that the degree of twist between points A and B may be measured. Advantageously such a measurement is an indirect method of measuring applied torque. An electrical intermediate device [1] is attached to point B on the shaft using a bar [26], collet [24] and a grub screw [25]. An antenna [2] comprising a planar arrangement of transmit and receive windings is attached to the shaft at point A. As a torque is applied to the shaft [23] the angular position of the shaft's circumference at point A shifts slightly relative to the angular position of the shaft's circumference at point B. The magnitude and sense of the angular variation is directly proportional to magnitude and sense of the applied torque up to the shaft's elastic limit. The magnitude of the angular variation may be increased by providing slots or grooves in the shaft—as shown in FIG. 13—in order to provide a sufficiently large angular variation that might be measured accurately. If the torque variation produces a maximum angular variation of +/−X degrees then preferably the antenna [2] and electrical intermediate device [1] are arranged in a multi-pitch construction of 360/2X pitches. The transmit windings [2a & 2b] are energised from an electrical supply via an annular transformer [27] whose central hole fits over the shaft [23]. The signals from the antenna's receive windings [2c & 2d] are transported using multiple windings of the same transformer [27] to an electronics circuit [3]. Preferably the axial distance between the transformer [27] and the antenna [2], as well as the distance between the electrical intermediate device [1] and the antenna [2] should be kept as small as possible to produce good levels of electrical coupling. Good electrical coupling produces good signal: noise ratios in the detector.

Figure 14:
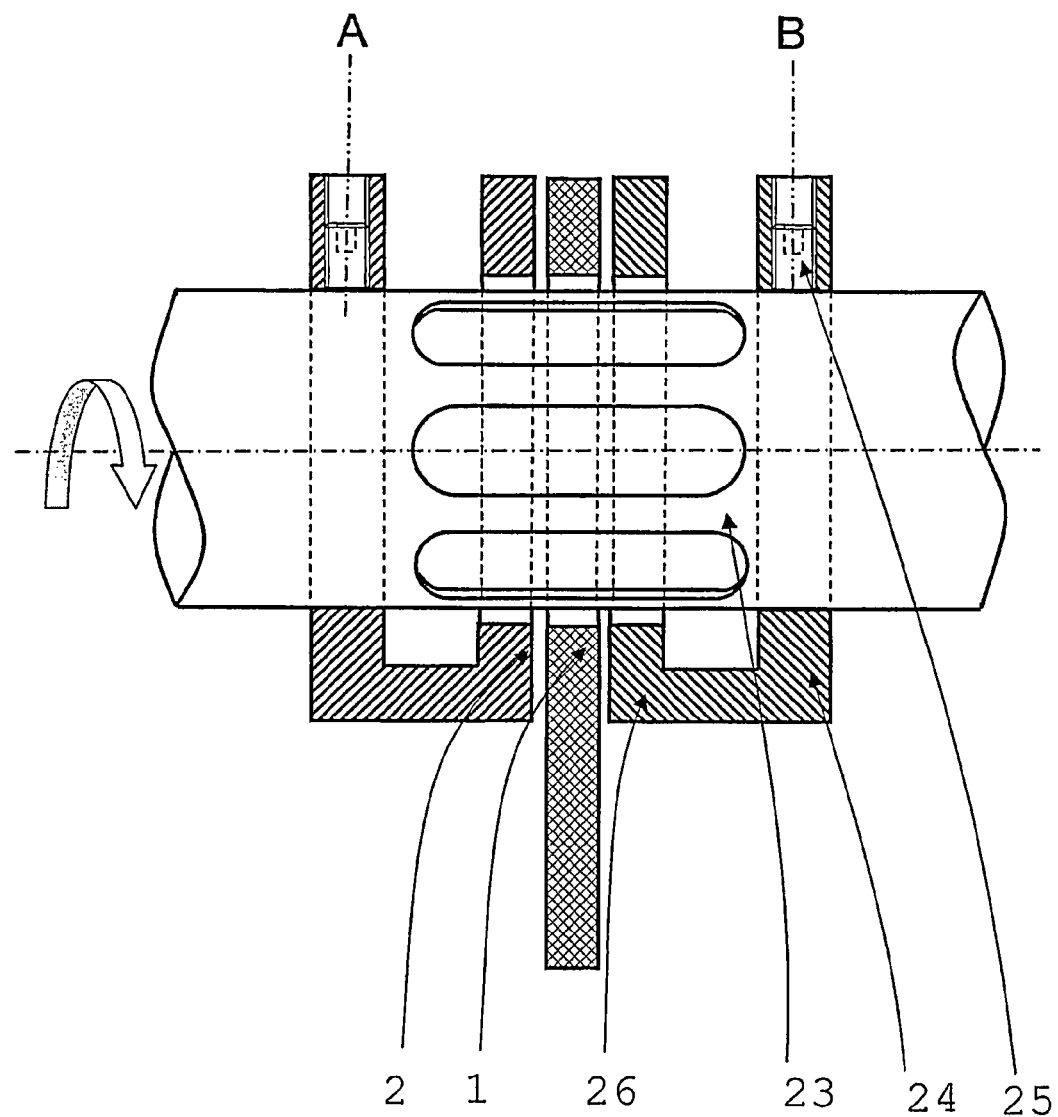
FIG. 14 shows an arrangement for measuring torque in a shaft.

FIG. 14 shows an alternative arrangement for the measurement of torque. Rather than a transformer [27], two electrical intermediate devices [1] are used on either side of the antenna [2]. The position of both may be measured as the shaft rotates such that their relative shift is indicative of applied torque.

The pitch of the receive windings is not necessarily L/4 for an electrical intermediate device of winding pitch L. This dimension was described for reasons of simplicity so as to make clear the possible use of simple arctan calculations performed on the two received signals.

A portion of the electrical intermediate device [1] is shown to vary as a smooth sinusoid however the variation need be neither smooth nor sinusoidal. For example, the function can be approximated by using largely rectangular or nested rectangular loops. In addition it will be obvious that any of the antenna [2] or electrical intermediate device [1] windings can be formed using multiple turns of generally the same shape to maximise electromagnetic coupling.

The antenna's transmit and receive windings [2a, 2b, 2c & 2d] may be simplified when the invention is used in a pulse echo mode. In this mode the windings are first of all energised with an AC signal which is then switched off to allow the windings then to receive any signals coming back from a resonating electrical intermediate device. Only 2 windings, with known separation, are required and there is no requirement necessarily for electrical balancing.

There is no absolute size limitation to the invention. The limits are set by limits of manufacturing processes rather than physical laws. At one extreme, very large sensors can be produced by winding copper wire over pegs arranged at defined positions on a surface. At the other extreme, very small sensors can be produced using deposition of conductive tracks on a silicon wafer. This is particularly advantageous when the tracks are deposited on the same silicon as that used for the electronics circuit in the form of an application specific integrated circuit. The use of conductive inks printed on to an insulating substrate such as polyester or polyamide are particularly useful technique to produce electrical intermediate devices and antennae. Advantageously, polyester and polyamide substrates may be produced in a flexible form which may also be printed with a contact adhesive for ease of attachment to a host system. In printed constructions electrical insulation at cross over points can be maintained by printing a first conductive track followed by an insulating layer at the area of the cross over and then another conductive track over the top of the insulating layer. Glass is a particularly good substrate in harsh environments due to its stability and low coefficient of thermal expansion. Further construction methods include double sided printed circuit board with plated through holes; ultrasonic bonding of insulated copper wire on to an insulated substrate and windings which are laser cut or stamped and then folded from sheet metal such as copper, aluminium or steel.

As has already been stated in the description of FIG. 1, the invention is not limited to the measurement of linear displacement. This will be obvious to those skilled in the art. If the arrangement of the electrical intermediate device [1] and antennae [2] is bent around an axis it can be seen that the invention is readily suitable for the measurement of rotary position. Further the electrical intermediate device [1] and antenna [2] can be arranged for a wide variety of sensing geometries including but not limited to curvi-linear, 2-dimensional (by the use of multiple overlapping linear encoders), cylindrical, roll, pitch and yaw.

To a significant extent, variation in the position of the electrical intermediate device [1] relative to the antenna [2] in axes other than the main measurement axis does not affect the measured value. In particular, the stand off distance between electrical intermediate device [1] and antenna [2] in the z-axis can vary without altering the measured displacement. The range of acceptable variation can be extended by bracketing the amplification factors used in the electronics circuit according to the amplitude of the received signals. If the electrical intermediate device [1] to antenna [2] distance is large then the amplitude of received signals will be small and large amplifications should be applied. The converse applies if electrical intermediate device [1] to antenna [2] distance is small.

The variation in signal amplitude caused by variation in stand off distance can be used as a relatively coarse measurement in multi-axis arrangements.

The invention is able to identify a multiplicity of electrical intermediate devices [1] and measure their displacement relative to the antenna [2] in a roughly concurrent fashion. This is accomplished by providing each electrical intermediate device [1] with its own resonant frequency. Individual resonant frequencies are most readily attained by careful selection of different capacitor values for example to produce 3 electrical intermediate devices [1] with resonant frequencies of 1, 2 and 3 MHz. The electronics circuit [3] can be programmed to excite at these frequencies in turn and carry out measurements for each electrical intermediate device [1]. In order to maximise the frequency and accuracy of measurements more sophisticated excitation and measurement algorithms can be used where, for example, the electrical intermediate device [1] which is found to be generally stationary is measured least and the one that has moved most recently or most often is measured most frequently.

Two transmit windings can be used rather than one with two loops [2a & 2b] thus avoiding the requirement for the constant width loops [1b & 1c] of the electrical intermediate device [1] windings. Each transmit winding will overlap the variable width portion of the electrical intermediate device [1a & 1d]. In such an arrangement, the electronics circuit [3] switches between transmit circuits and chooses the one which produces maximum receive signals. In this case the invention's level of electromagnetic emissions can be reduced by balancing each loop of each transmit winding with a counter wound loop away from the electrical intermediate device [1]. In this way any transmissions to the far field will be negated. This also maintains balance with each receive windings [2c & 2d].

It will be appreciated by those skilled in the art that the invention is not restricted by a particular number or arrangement of windings and that various permutations of number, spacing and arrangement are feasible. For example, a repeating but aperiodic winding arrangement of the electrical intermediate device's inductor [21] may be used with a single transmit winding and three receive windings spaced along the measurement path. Electronic comparison of the amplitude of the received signals in each of the receive windings will be unique for any position of the electrical intermediate device [1] relative to the antenna [2]. Such readings may be compared to a previously made look-up table held in electronic memory in order that a unique or absolute, rather than incremental, position may be reported.

Multiple electrical intermediate devices [1] and multiple antennae [2] may be constructed on the same physical unit of printed circuit board by simply avoiding electrical connection between the various systems. Multiple layer PCB is particularly useful in this regard. Such constructions are particularly advantageous in detectors for safety related environments where electrical redundancy is necessary. In an electrically redundant system a multiplicity of electrical intermediate devices [1] of varying frequencies may be concurrently detected using a multiplicity of antennae [2] energised with the relevant frequencies, each antenna [2] being controlled by its own electronic circuit [3].

In some safety related applications or applications where high levels of availability and reliability are required then detectors may be constructed with self checking hardware and software. Not only can the electronic circuit's [3] software contain the traditional techniques associated with checking for open circuits, out of bounds measurements etc. but an electrical intermediate device [1] may be fixed relative to the antenna [2]. In this way a self diagnostic check may be carried out by measuring the position of the fixed electrical intermediate device [1]. If the fixed device [1] appears to have moved form its known position past predefined limits then this may be taken as a fault and an alarm or corrective action taken accordingly.

In order to maximise received signal strength and hence maximise the signal:noise ratio the electronics circuit [3] should include a frequency tuning circuit so that the exact resonant frequency of the electrical intermediate device [1] or devices may be used as the transmit frequency. In this way a maximum amount of transmitted energy goes in to producing electrical resonance of the electrical intermediate device [1] and, in turn, the electrical intermediate device [1] produces maximum electromagnetic signal.

In FIG. 1 it can be seen that the measurement scale is limited by the length of the electrical intermediate device [1]. In practice, the linear portion of the measurement is restricted to less than 100% of the length of the electrical intermediate device [1] in order that both receive windings [2c & 2d] are in view of the electrical intermediate device [1]. The length of the electrical intermediate device [1] need not be a limiting factor to the invention because a further receive winding can be used which comes in to play when the electrical intermediate device [1] leaves the view of either of the other two receive channels [2c & 2d]. This can be achieved by a simple multiplexer which is controlled by the electronic circuit [3]. This problem does not apply in general to rotary arrangements since the measurement scale is essentially continuous.

The invention's susceptibility to electromagnetic emissions can be improved by balancing each loop of the receive circuit [2c & 2d] with a counter wound loop away from the electrical intermediate device [1]. In this way any incoming emissions from the far field will be negated before it is detected by the electronics circuit [3].

Preferably any material present between the electrical intermediate device [1] and antenna [2] is an insulator such as plastic, ceramic or wood. A metal barrier can be placed between them so long as the excitation or resonant frequency is sufficiently low to permit the signals to carry through the metal's skin depth. If a metal barrier is essential then preferably the metal has a relatively low magnetic permeability such as non-magnetic stainless steel (e.g. 316 grade stainless). A frequency of 40 kHz is, for example, sufficient to permit the transmission of signals through 2 mm thick, non-magnetic 316 grade stainless steel sheet.

Thus far the antenna [2] has been described with co-planar transmit and receive windings [2a, 2b, 2c & 2d]. This is preferable but not necessary. The various windings may be, for example, placed on either side of the electrical intermediate device and act as a mechanical guide.

The detector has particular utility in determining the position of vehicles and automatically guided vehicles. In such applications the electrical intermediate device [1] is preferably fixed to the floor and the detector's antenna [2] and control electronics [3] attached to the underside of the vehicle (or vice versa) so that a position reading may be taken as the vehicle passes over it.

For most applications the effect of extreme or changing temperatures will have negligible effect on measurement performance. In some applications, however, very high accuracy measurement is required even though the operating temperature range or variation rate may be extreme. In such instances, the relatively small expansion or contraction of the antenna [1] or target [2] may lead to erroneous measurement. Such temperature effects may be counteracted by measuring the actual operating temperature and modifying the measured position accordingly, i.e. reducing or increasing the measured value according to the temperature. Temperature can be measured using a thermocouple or resistance device but preferably the resistance of one or more of the antenna windings [1a, 1b or 1c] can be used to provide an indication of temperature. Measurement of the winding resistance is preferable to measurement by a thermocouple because the windings provide a more representative measurement due to their position along the measurement axis (rather than being constrained to a single point as with a thermocouple).

There are many applications for the invention including, but not limited to: actuators, aileron controls, angle sensors, radar antenna tracking, anti-counterfeit devices, audio controls, automatic guided vehicles, automatic teller machines, automation equipment, ball screws, boilers, brake sensors, brake wear sensors, burners, climate controls, cockpit controls, component identification, consumer electronics, cookers, cooking ranges, cooktops, dials, direction indicators, dishwashers, displacement sensors, door travel sensors, elevators, end of shaft encoders, fitness equipment, flow sensors, food mixers, fuel level sensors, fuel metering, games, gauges, giant magnetoresistive sensor replacements, guided vehicle tracking, gunnery sights, Hall affect replacements, headlamp level controls, HVAC sensors, hydraulic actuators, hydraulic valves, identification tags, impellers, inclinometers, indexing tables, indicator gauges, Inductosyn replacements, industrial control panels, joysticks, kitchen goods, lifts, lighting controls, limit switch replacements, linear actuators, liquid level sensors, load sensors, LVDT replacements, machine tools, magnetostrictive sensor replacements, marine engines, marine equipment, mining equipment, missile guidance, motion controllers, motor encoders, odometers, packaging equipment, palletisers, paper thickness sensors, pedal sensors, pen sensing, petrochemical sensors, plotter controls, pneumatic actuators, pneumatic valves, pressure sensors, printer write heads, PRNDL sensors, proximity sensors, push buttons, radar controls, ride height sensors, robots, roll/pitch/yaw sensors, roller separation sensors, rotary encoders, RVDT replacements, safety switches, seating instrumentation, security tags, servo motors, shaft encoders, sheet feeders, skis, sliders, speed sensors, sports equipment, steering angle sensor, steering column controls, stepper motors, strain measurement, suspension dampers, suspension sensors, tachometers, tamper evident devices, throttle controls, tilt sensors, torque sensors, toys, traction control, transmission sensors, turbines, user interface elements, utility meters, valves, velocity sensors, vibration sensors, washing machines, weight sensors, wheel sensors, workpiece identification.

The invention claimed is:

1. An inductive position detector comprising:
an electrical intermediate a inductive device defining a measurement path; and
an inductive antenna comprising at least two receive windings which have a fixed relative spacing along the measurement path; said electrical intermediate inductive device being a distinct device from said antenna wherein:
relative movement of the electrical intermediate inductive device and the inductive antenna changes the position of the inductive antenna on the measurement path;
the electrical intermediate inductive device comprises a substantially laminar passive resonant circuit formed by at least an outward conductive winding, a return conductive winding and a capacitor arranged in series with the conductive windings;
the outward winding and the return winding of said electrical intermediate inductive device cross to form at least two inductive loops of opposite current flow, in use, and the transverse distance of the outward winding to the measurement path varies with distance along the measurement path according to a predefined relationship such that the mutual inductance of the receive windings of said antenna and the passive resonant circuit of said electrical intermediate inductive device is a function of the position of the antenna on the measurement path; and the antenna is configured to induce an alternating current in the passive resonant circuit of said electrical intermediate inductive device, in use, such that the induced alternating current in the passive resonant circuit induces an alternating signal in the receive windings of said antenna by virtue of the mutual inductance of the receive windings of said antenna and the passive resonant circuit of said electrical intermediate inductive device, which signal is indicative of the position of the antenna on the measurement path; wherein said passive resonant circuit of said electrical intermediate inductive device comprises at least one pick-up winding in series with said outward and return conductive windings; said pick-up winding having substantially constant width along the measurement path.

2. An inductive position detector as claimed in claim 1, wherein the transverse distance of the return winding to the measurement path varies with distance along the measurement path according to a predefined relationship.

3. An inductive position detector as claimed in claim 1, wherein the area defined by each of the said inductive loops is substantially equal.

4. An inductive position detector as claimed in claim 1, comprising a plurality of electrical intermediate inductive devices, each comprising a respective resonant circuit, with each resonant circuit having a different resonant frequency.

5. An inductive position detector as claimed in claim 1, wherein the receive windings of the antenna are supplied, in use, with a pulsed alternating current which induces an alternating current in the passive resonant circuit of said electrical intermediate inductive device, such that the passive resonant circuit induces an alternating current in the receive windings of the antenna in the off periods of the pulsed alternating current.

6. An inductive position detector as claimed in claim 1, wherein the antenna comprises at least one transmit winding arranged to induce an alternating current in the passive resonant circuit of said electrical intermediate inductive device.

7. An inductive position detector as claimed in claim 6, wherein the transmit winding of said antenna has a substantially constant width along the measurement path.

8. An inductive position detector as claimed in claim 6, wherein the antenna comprises two transmit windings of substantially the same area but opposite directions of current flow, such that in the absence of the electrical intermediate inductive device, substantially no signal is induced in the receive windings of said antenna by the transmit windings of said antenna.

9. An inductive position detector as claimed in claim 1, wherein the transverse distance of the outward winding of said electrical intermediate inductive device to the Measurement path varies periodically with distance along the measurement path.

10. An inductive position detector as claimed in claim 9, wherein the spacing of the receive windings of said antenna is substantially equal to an integer multiple of one quarter of the period of the variation of the transverse distance of the outward winding to the measurement path.

11. An inductive position detector as claimed in claim 9, wherein the electrical intermediate inductive device comprises a second passive resonant circuit comprising a second outward conductive winding, with the transverse distance of the second outward winding to the measurement path varying periodically with distance along the measurement path, and wherein the period of the periodic variation for each outward conductive winding is different.

12. An inductive position detector as claimed in claim 11, wherein the difference in the periods of the two outward windings is such that the combination of the distance of each outward winding from the measurement path at a given position along the measurement path uniquely identifies that position along the measurement path.

13. An inductive position detector as claimed in claim 11, wherein the two outward windings are spaced in a direction transverse to the measurement path.

14. An inductive position detector as claimed in claim 11, wherein each passive resonant circuit of the electrical intermediate inductive device has a different resonant frequency.

15. An inductive position detector as claimed in claim 1, wherein the transverse distance of the outward winding of said electrical intermediate inductive device to the measurement path varies sinusoidally with distance along the measurement path.

16. An inductive position detector as claimed in claim 1, wherein the windings are provided as conductive tracks on a printed circuit board.

17. An inductive position detector as claimed in claim 1, wherein the windings of the passive resonant circuit of said electrical intermediate device are provided on a substantially laminar substrate having two opposed faces and the outward conductive winding of said electrical intermediate device is provided on one of said faces and the return conductive winding of said electrical intermediate device is provided on the other of said faces.

18. An inductive position detector as claimed in claim 1, wherein the measurement path is linear.

19. An inductive position detector as claimed in claim 1, wherein the measurement path is curved, particularly circular.

20. An inductive position detector as claimed in claim 1;
wherein the antenna comprises at least one transmit winding arranged to induce an alternating current in the passive resonant circuit of said electrical intermediate device;
wherein the spacing of the receive windings is substantially equal to an integer multiple of one quarter of the period of the variation of the transverse distance of the outward winding to the measurement path;
wherein said passive resonant circuit of the electrical intermediate inductive device has a resonant frequency;
wherein the windings are provided as conductive tracks on a printed circuit board;
wherein the measurement path is linear.

21. A method of temperature compensation in a detector as claimed claim 1, the method comprising measuring the resistance of at least one transmit winding of the antenna.

22. A method of measuring torque on a rotating shaft, the method comprising:
providing an inductive position detector with:
an electrical intermediate inductive device defining a measurement path; and
an inductive antenna comprising at least two receive windings which have a fixed relative spacing along the measurement path, wherein:
relative movement of the electrical intermediate inductive device and the inductive antenna changes the position of the inductive antenna on the measurement path;

the electrical intermediate inductive device comprises a substantially laminar passive resonant circuit formed by at least an outward conductive winding, a return conductive winding and a capacitor arranged in series with the conductive windings;

the outward winding and the return winding of said electrical intermediate inductive device cross to form at least two inductive loops of opposite current flow, in use, and the transverse distance of the outward winding to the measurement path varies with distance along the measurement path according to a predefined relationship such that the mutual inductance of the receive windings and the passive resonant circuit of said electrical intermediate inductive device is a function of the position of the antenna on the measurement path; and the antenna is configured to induce an alternating current in the passive resonant circuit of said electrical intermediate inductive device, in use, such that the induced alternating current in the passive resonant circuit induces an alternating signal in the receive windings of said antenna by virtue of the mutual inductance of the receive windings of said antenna and the passive resonant circuit of said electrical intermediate inductive device, which signal is indicative of the position of the antenna on the measurement path; wherein said passive resonant circuit of said electrical intermediate inductive device comprises at least one pick-up winding in series with said outward and return conductive windings; said pick-up winding having substantially constant width along the measurement path; the measurement path being curved;

mounting the electrical intermediate inductive device about the shaft for rotation therewith such that measurement path follows the circumferential direction of the shaft;

mounting the antenna on the shaft for rotation therewith;

detecting the induced signal in the antenna by means of inductive coupling;

determining relative movement of the electrical intermediate inductive device and the inductive antenna indicative of a torque on the shaft.

23. An inductive position detector comprising:
  an electrical intermediate inductive device defining a measurement path; and
  an inductive antenna comprising at least two receive windings which have a fixed relative spacing along the measurement path, wherein:
  relative movement of the electrical intermediate inductive device and the inductive antenna changes the position of the inductive antenna on the measurement path;
  the electrical intermediate inductive device comprises a substantially laminar passive resonant circuit formed by at least an outward conductive winding, a return conductive winding and a capacitor arranged in series with the conductive windings;
  the outward winding and the return winding of said electrical intermediate inductive device cross to form at least two inductive loops of opposite current flow, in use, and the transverse distance of the outward winding to the measurement path varies with distance along the measurement path according to a predefined relationship such that the mutual inductance of the receive windings and the passive resonant circuit of said electrical intermediate inductive device is a function of the position of the antenna on the measurement path;
  the antenna is configured to induce an alternating current in the passive resonant circuit of said electrical intermediate inductive device, in use, such that the induced alternating current in the passive resonant circuit induces an alternating signal in the receive windings of said antenna by virtue of the mutual inductance of the receive windings of said antenna and the passive resonant circuit of said electrical intermediate inductive device, which signal is indicative of the position of the antenna on the measurement path;
  the transverse distance of the outward winding of said electrical intermediate inductive device to the measurement path varies periodically with distance along the measurement path; and
  the electrical intermediate inductive device comprises a second passive resonant circuit comprising a second outward conductive winding, with the transverse distance of the second outward winding to the measurement path varying periodically with distance along the measurement path, and wherein the period of the periodic variation for each outward conductive winding is different.

24. An inductive position detector comprising:
  an electrical intermediate inductive device defining a measurement path; and
  an inductive antenna comprising at least two receive windings which have a fixed relative spacing along the measurement path, wherein:
  relative movement of the electrical intermediate inductive device and the inductive antenna changes the position of the inductive antenna on the measurement path;
  the electrical intermediate inductive device comprises a substantially laminar passive resonant circuit formed by at least an outward conductive winding, a return conductive winding and a capacitor arranged in series with the conductive windings;
  the outward winding and the return winding of said electrical intermediate inductive device cross to form at least two inductive loops of opposite current flow, in use, and the transverse distance of the outward winding to the measurement path varies with distance along the measurement path according to a predefined relationship such that the mutual inductance of the receive windings of said antenna and the passive resonant circuit of said electrical intermediate inductive device is a function of the position of the antenna on the measurement path;
  the antenna is configured to induce an alternating current in the passive resonant circuit of said electrical intermediate inductive device, in use, such that the induced alternating current in the passive resonant circuit induces an alternating signal in the receive windings of said antenna by virtue of the mutual inductance of the receive windings of said antenna and the passive resonant circuit of said electrical intermediate inductive device, which signal is indicative of the position of the antenna on the measurement path;
  wherein said electrical intermediate inductive device incorporates multiple overlapping conductive windings with distinct pitches.

* * * * *